United States Patent
Kendall et al.

[11] Patent Number: 6,082,251
[45] Date of Patent: *Jul. 4, 2000

[54] APPARATUS AND METHOD FOR COOKING FOOD PRODUCTS FOR CONSUMPTION

[75] Inventors: John Hugh Kendall, Sugar Land; Banvir B. Mohindra; Duane Stephen Rutherford, both of Houston, all of Tex.; Satoru Satake, Tokyo, Japan; Sigeharu Kanamoto; Katsuyuki Kumamoto, both of Mihara, Japan

[73] Assignees: Riviana Foods, Inc., Houston, Tex.; Satake Corp., Higashi-Hiroshima, Japan

[ * ] Notice: This patent is subject to a terminal disclaimer.

[21] Appl. No.: 08/842,324

[22] Filed: Mar. 24, 1997

Related U.S. Application Data

[63] Continuation of application No. 08/658,980, Jun. 4, 1996, Pat. No. 5,613,428, which is a continuation of application No. 08/116,114, Sep. 2, 1993, abandoned.

[51] Int. Cl.[7] .................................................. A23B 4/08
[52] U.S. Cl. ........................... 99/473; 19/516; 19/477; 19/448; 19/450; 126/369.2; 126/20.1
[58] Field of Search ................................. 99/473, 516, 477, 99/448, 450, 407, 409, 410, 411, 416, 417, 474, 475, 522, 525, 526, 527, 528, 529, 530, 531, 443 R; 126/369, 369.2, 369.3, 20.1, 20.2, 21 A

[56] References Cited

U.S. PATENT DOCUMENTS 5,613,428  3/1997  Kendall et al. ............................ 99/473

*Primary Examiner*—Reginald L. Alexander
*Attorney, Agent, or Firm*—Arnold, White & Durkee

[57] ABSTRACT

An apparatus and method are disclosed for cooking food products. In particular, cereal grains and rice products may be cooked pursuant to a multi-step process in which rice is first prewashed, presteamed, and then allowed to absorb water in a steeping step for a short time before being cooked in a steam cooker. The rice may be passed along to various dryers, and later dried and packaged for use by the consumer. Further, an apparatus and method are disclosed for using and recirculating water in a more efficient and economical manner in a food processing operation.

22 Claims, 16 Drawing Sheets

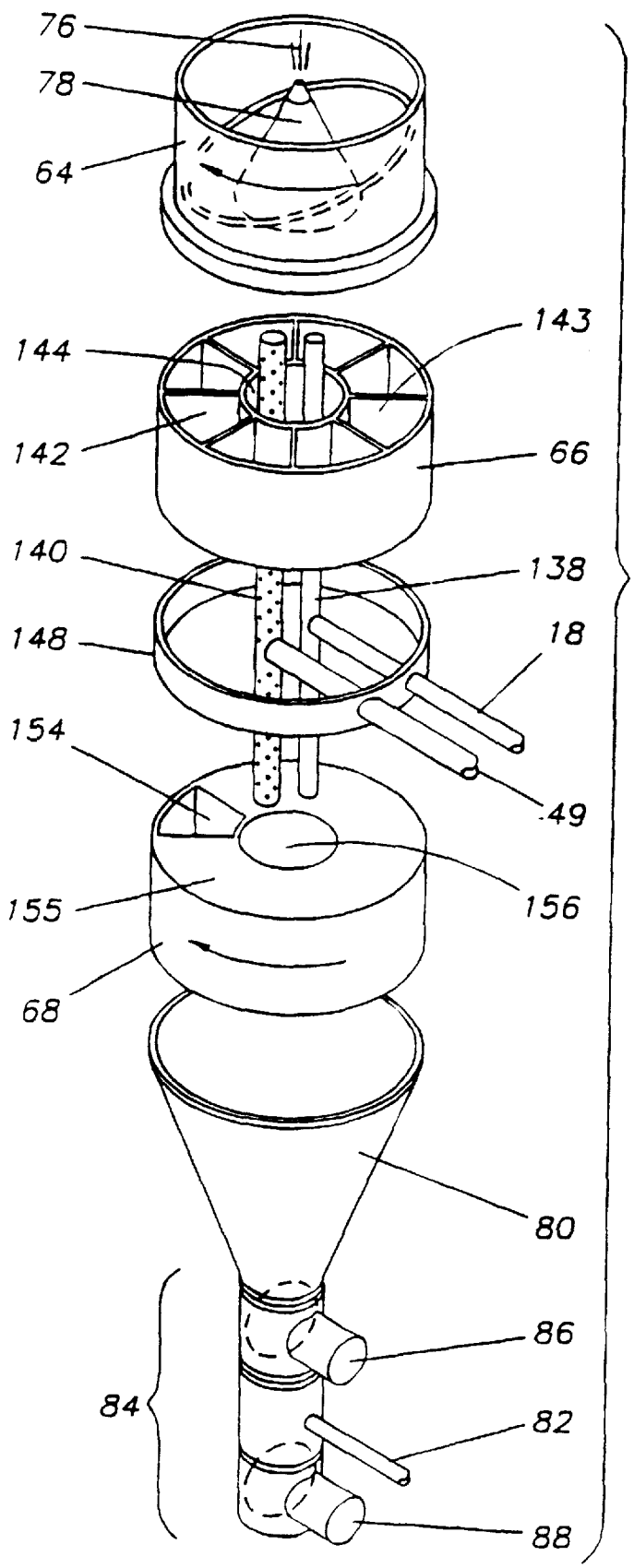
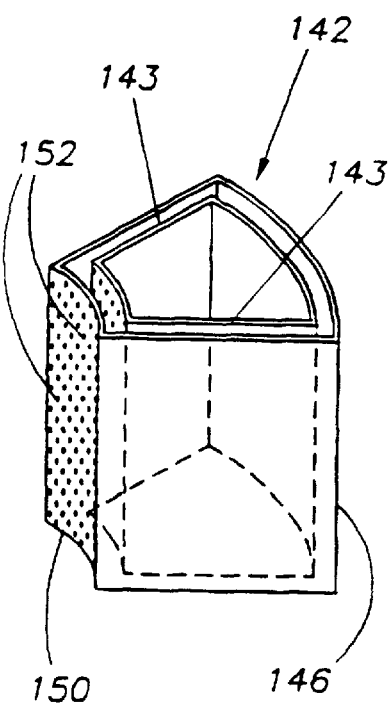
FIG. 7
FIG. 8

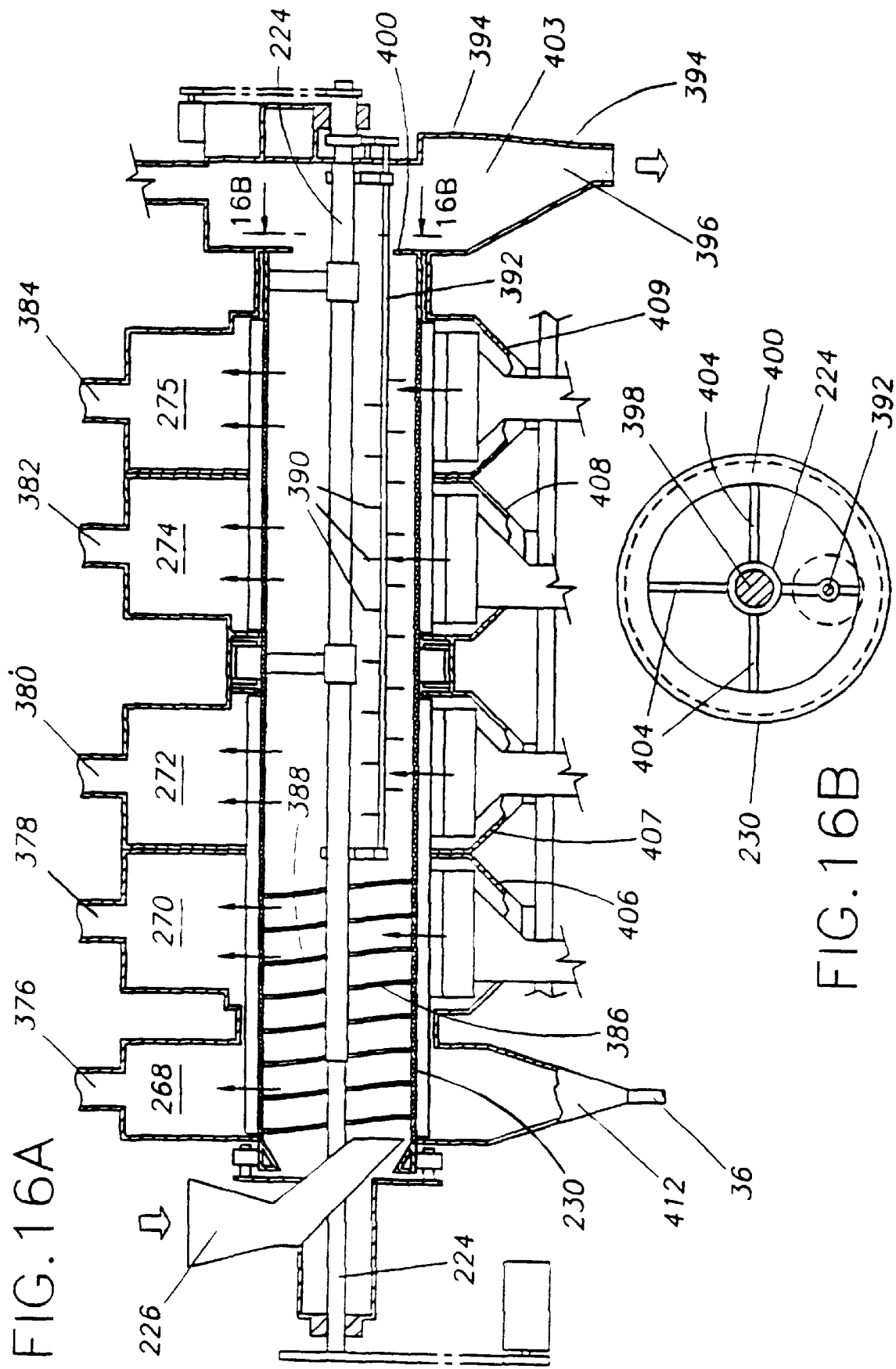

APPARATUS AND METHOD FOR COOKING FOOD PRODUCTS FOR CONSUMPTION

This is a continuation of application Ser. No. 08/658,980, filed Jun. 4, 1996 now U.S. Pat. No. 5,613,428, which is a continuation of application Ser. No. 08/116,114, filed Sep. 2, 1993; now abandoned.

BACKGROUND OF THE INVENTION

The invention relates to a method and apparatus for processing foodstuffs; more particularly, this invention relates to methods and apparatus for processing rice to achieve a quick-cooking rice.

Mankind is continually searching for new and better methods of cooking cereal grains, vegetables and other foodstuffs. In large scale commercial operations, the cooking of foodstuffs requires special apparatus and specially adapted cooking methods that will provide a uniform and desirable food product while at the same time handling large quantities of foods.

In the cooking of certain starch-containing foods such as vegetables and cereal grains, several problems are encountered. First, the food granules must be moved from storage tanks to processing vessels, and in some cases to holding tanks or cooking vessels, and then they may be distributed to dryers to remove water from the food granules. The physical transport of the food granules during such processing must be well regulated and maintained to achieve a desirable flow of food particles through the processing system from one processing step to another, without undesirable clumping or aggregation of food granules.

In certain cases the physical handling and heat applied to grains during cooking is designed to result in physical or chemical changes to the starch or other molecules that are contained in the food stock itself. For example, in the cooking of cereal grains, such as rice, the goal is to gelatinize the starches in the grain. In such a process, loose starch molecules may be leached out of the food granules or the starch molecules may be ruptured as a result of handling or processing. If that occurs, then cooking processes may tend to glue together the granules, slowing advancement of the food product through the processing system. This "gluing" problem is particularly troublesome in the cooking of rice and, if allowed to proceed unabated, will cause the surface of rice particles to stick together, causing large globules to form, making further transport and processing of the rice impractical, if not impossible.

In the past, the problem of "gluing" of food granules by the release or rupture of starch molecules could be controlled, at least to a limited degree, by using large amounts of fluid in transporting the food through the processing machinery, cookers, conduits, and the like. Typically, water is used as a transport fluid, and large amounts of water tend to dilute the "glue" (free hydrated starch), thereby minimizing the adverse effect of free starch. By using large amounts of water, cereal grains may be processed without the undesirable globules forming to slow the transport of the grains through processing equipment. However, such use of water to dilute this gluing effect results in spent process water with large amounts of free starch which must be discarded or further processed such as by water treatment.

Unfortunately, many communities have greatly increased the fees that commercial users must pay for water in such food processing operations. As such, the processing of food wherein large amounts of water are required has become extremely expensive in these communities, and newer and better methods of transporting and cooking food in a processing system, while using less water, are highly desirable.

Also, in the past, water used in a food processing system for transport of food has been discarded as waste water at the point in the processing after which the water is no longer needed for transport of the food. However, recent environmental regulations have greatly curtailed the amount of waste water and waste materials that may be disposed of by food processing facility. Moreover, many public utilities and water companies charge corporate water consumers not only on the basis of the amount of water consumed, but also on the basis of the number of gallons of waste water that is discharged back into the public sewer system. Therefore, it is desirable to limit the amount of waste water that is produced by a food processing plant.

Additionally, the greater the amount of water used in commercial processing, the greater is the amount of heat energy that must be applied to reach a desirable temperature level. If less water is utilized in a batch processing system, substantial savings in power consumption can be achieved. A batch processing system may, therefore, operate at a lower cost per pound of food processed.

Commercial rice cooking methods consume and excrete very large amounts of water. For example, in the commercial cooking of one cup of rice, prior methods required as much as a 20:1 ratio of water used to rice produced pursuant to the processing method. A great advantage in food processing would be a cooking method that allows food granules, such as rice, to be cooked with a ratio of water consumption to food production of as little as 2:1 or perhaps even less.

Another problem in the food industry is the production of a uniform final product, especially in high production batch or continuous processes. For example, cooking cereal grains in a uniform manner so that each grain receives substantially identical conditions during cooking presents a challenge.

The challenge arises because numerous variables exist in processing and because of the difficulty in exposing each grain to the same overall history of cooking conditions. The first variable is the amount of heat applied. The greater the amount of heat applied, the greater the gelatinization of starch within the grain, and the quicker the rice will cook. Furthermore, an increase in the pressure during the cooking of rice will increase the rate at which the starch is gelatinized, and therefore, it will speed the cooking of the rice. If the rate of gelatinization of the rice is too high, or if the pressure and temperature conditions are not optimum during the cooking and drying of the rice, the individual grains may be physically harmed by the formation of small pockets of air or dead space within the grain itself. These pockets cause the rice to become brittle after it is dried, resulting in an inferior product that consumers find undesirable.

Accordingly, what has been needed in the industry is a cooking apparatus and method that will provide for the uniform cooking of the food granules in a continuous processing system without using or excreting excess water, and while avoiding the gluing together of the food granules.

SUMMARY OF THE INVENTION

The present invention comprises a steam cooker for cooking food products, wherein a steam chamber comprises a plurality of vertically arranged steam zones. Additionally, a means to provide steam to the plurality of steam zones is included, and a means to releasably form the steam zones within the steam chamber and to support the food products within each of the zones is provided.

Further, a means to releasably form the steam zones may comprise a plurality of vertically spaced partitions, the partitions being capable of manipulation to accommodate the support of the food product within each zone, yet capable of further manipulation to facilitate the transfer of the food product to another vertically aligned zone upon the manipulation of the partition.

In another aspect of the invention, a steam cooker is provided wherein each partition rotates about an axis, and wherein the partitions may be manipulated to a support or a cooking position, wherein the partitions facilitate the steam cooking of food products, wherein the rotation of the partitions into the flow position facilitates the advancement of food products among the successive steam zones within the steam cooker. Additionally, the steam cooker may include partitions which provide steam to the food products in the cooking of food products. Further, the rotation of each partition is accommodated by a rotatable shaft, the shaft supplying steam for the cooking of the food products.

In another embodiment, the steam cooker includes steam flow lines and exit ports provided along the surface of each partition, such that steam may be supplied to food products while the products are supported on the partitions. Further, the steam cooker is provided with a plurality of partitions which are independently rotatable and work in unison to define separate zones. Further, the steam cooker wherein each successive steam zone is larger than the immediately preceding zone is shown, to facilitate the gravimetric flow of food products through the steam cooker. Further, a discharge port at the bottom of the steam cooker may be shown. Further, a supply line for providing fluid to entrain the cooked food product away from the steam cooker exists in this invention.

In another aspect of the invention, a steam cooker for cooking food products is presented, wherein a steam chamber is adapted to provide a steam environment for the cooking of food products. Additionally, a rotatable support structure within the steam chamber is included, comprising rotatable arms which support the food products while the food products are being subjected to steam cooking, and further, the invention includes a means for supplying steam to the steam chamber.

In another embodiment, the rotatable support structure comprises a central rotatable shaft which supports the arms, wherein the means for supplying steam includes a means for supplying steam radially outwardly from the shaft. Additionally, the steam cooker includes a means for supplying steam radially inwardly. Further, a means for supplying steam includes a means on said rotatable arms.

Further, in one embodiment, a stationary, radially oriented system of plates is within the steam chamber to facilitate the separation of the steam chamber into cooking zones, and to prevent excess agitation which might otherwise damage the structural integrity of the food products during rotation of the shaft.

In another aspect of the invention, a method of cooking food products is presented wherein the food product is transferred in stepwise fashion through a plurality of vertically separated zones within a steam chamber. The food product is supported within each separate zone while supplying steam to the food product within that zone, and food products are conveyed from the steam cooker after the food product has progressed through the zones of the steam cooker.

In another method of the invention, the food product is supported within each successive zone by a moveable partition, wherein the transfer of the food product through the successive zones in stepwise fashion is accomplished by manipulating each partition in a manner to accommodate the food product to be transferred to the next zone. Further, the step may be provided of administering steam to the food product from steam sources below the product upwards and from above the product down on top of the product, while in each successive zone, to facilitate the uniform cooking of the food product.

In another aspect of the invention, the invention comprises a method of cooking rice in a steam cooker, wherein preconditioned rice is transferred to a steam chamber, and supported within a plurality of vertically arranged zones. The rice is then steamed, while being transferred to successive steam zones. The rice is retained within each steam zone for a predetermined period of time, and then conveyed out of the steam chamber after the food product has progressed through the successive zones of the steam chamber. Further, the steam may be provided to the rice at a controlled rate to facilitate the cooking of rice while substantially avoiding adverse gluing effects. Additionally, the rice remains dispersed, thereby avoiding undesirable accumulation of rice in the form of globules. The rice is successively transferred from one zone to another by the movement of partitions which separate the steam zones in one embodiment.

The rice may be steamed from below, from above, or from above and below. The residence time of the rice within each steam zone is regulated by activating the partitions, thereby allowing rice to flow from one steam zone to another. Rice is preconditioned by presteaming in one method, and in another method the rice may be preconditioned by prewashing. The rice may be preconditioned by administering a chemical additive to the rice before or during steaming, or after steaming.

In one method, the rice conveyed out of the cooker exhibits a moisture content of between about 50 and 65% moisture. Further, a method is provided wherein the rice additionally is preconditioned by presteaming after prewashing.

In another aspect of the invention, a method of cooking the food product is disclosed comprising the steps of discharging the food product into an annular steam cooking chamber, conveying the food product through the steam chamber in a vertically downward manner while supporting at least a portion of the food product on radially extending projections mounted on a central shaft within the steam chamber and subjecting the food product to steam which is provided radially inwardly and radially outwardly within the steam chamber. Further, the method is shown including the step of conveying the food product away from the steam chamber in a water slurry.

In another aspect of the invention, the method of cooking rice comprises transferring preconditioned rice to a steam chamber, conveying the rice through the steam chamber in a vertically downwardly manner while supporting at least a portion of the rice on radially extending projections mounted upon a central shaft within the steam chamber, steaming the rice by providing steam radially inward towards the center of the chamber and radially outward towards the periphery of the chamber, and conveying the rice out of the steam chamber. Further, the method is shown wherein the rice is preconditioned by prewashing, or presteaming, or both. Further, the rice is conveyed out of the cooker with a moisture content of between about 50 and 65% moisture.

In another aspect of the invention, a steam cooker for cooking a food product is shown, comprising a cylindrical housing of segments having a receiving end, a discharge end, and a central axis, wherein the receiving end is above the discharge end to facilitate gravity-induced movement of products through the cylindrical housing from the receiving end to the discharge end in cooking the food products. In that embodiment, a cooking section is between the receiving end and the discharge end, and is defined by a plurality of circumferentially arranged segments, each segment being provided to facilitate the transfer of food products through the cooking section and to facilitate the more uniform cooking of the individual food products.

In another aspect of the invention, the steam cooker is provided wherein each segment of the cooker is pie-shaped in cross-section and wherein sources are provided to supply steam radially inwardly and outwardly within each segment. Further, the steam cooker is shown comprising a discharge segment near the discharge end of the cylindrical housing. Additionally, a steam cooker for cooking cereal grains is shown, wherein the cylindrical housing has a receiving end and a discharge end, and a central axis, wherein the cylindrical housing is positioned with the receiving end above the discharge end to facilitate gravity-induced feed of food granules through the cylindrical housing from the receiving end to the discharge end in cooking the food granules. Further, one or more funnel segments comprising the receiving end of the cylindrical housing are adapted for receiving and distributing the cereal grains. A discharge segment comprising the discharge end of the cylindrical housing is shown, wherein the discharge segment may be rotated independently of other segments to achieve a more uniform heat and steam distribution to the cereal grains during cooking. A plenum chamber is associated with the cylindrical housing, the plenum chamber adapted for transmission of water or steam to the cereal grains. A cooking chamber within the cylindrical housing is shown wherein the cooking chamber is arranged about the central axis of the housing, and it is perforated for the entry of water or steam to facilitate the cooking of the cereal grains. Further, water or steam is provided from the plenum chamber to the cooking chamber, and the cooking chamber is at a pressure of no more than about 2 times atmospheric pressure.

In another embodiment, the above steam cooker is shown wherein the funnel segment additionally comprises a cone spreader to facilitate heat and steam transfer to the cereal grains.

Advantages of the present invention are numerous. For example, there is a reduction in the amount of water that is used in the process, as a result of efficient use of the water. In particular, water is used in the process in quantities roughly equivalent to the amount of water that can be absorbed by the rice grains at that point in the process.

Further, the steam cooking is accomplished so that there is a high clarity water at the end of the cooking process, lending to the reuse of water from that point in the process for other steps, as a result of proper presteaming and the use of proper water volumes and cooking temperatures.

In addition, the invention shows an avoidance of gluing conditions in the overall process to assure efficient transport of the food product.

Another significant advantage is the uniform cooking of individual rice grains, as a result of the overall process, and in particular, in the design of the cookers.

The present invention advantageously reduces the amount of water consumed in the processing of food granules such as vegetables or cereal grains, and reduces the amount of waste water that is discharged in such processing, providing a more advantageous method of cooking the vegetables or cereal grains at an appropriate temperature and for an appropriate length of time, while minimizing the production and adverse affects of starch which glues together the food particles, thereby facilitating the flow of food particles through the system.

BRIEF DESCRIPTION OF THE DRAWINGS

FIG. 7 is a longitudinally exploded view of an alternative embodiment of a steam cooker as shown in FIG. 6;

FIG. 8 is a closeup view of the arrangement of one of the cooking chambers within the steam cooker shown in FIGS. 6 and 7;

FIG. 12 is yet another embodiment of a steam cooker of the present invention;

FIG. 15A is a cross-sectional view of the vibratory drainer which is mounted at the opening of the rotary dryer (as seen in FIG. 14) in the preferred embodiment of this invention;

FIG. 15B is an end view of the vibratory drainer shown in FIG. 15A;

FIG. 16A is a cross-sectional view of the rotary dryer of the present invention;

FIG. 16B is an end view of the barrel assembly, showing one arrangement of the containment mechanism that may be used in the invention;

DESCRIPTION OF THE PREFERRED EMBODIMENT

The Overall Apparatus and Method

In the preferred embodiment of the present invention, food granules are treated by prewashing, presteaming, steeping, and then transferring the food granules to a steam cooker, followed by transfer to one or more drying stages. After drying, the food granules may be packaged for distribution to the consumer. Further, the present invention advantageously utilizes water in an economical manner by limiting the total amount of water used in the processing of the food granules, and by limiting the amount of water excreted in the processing of the food granules.

The amount of water used in the present invention of processing rice, for example, is usually the minimum amount of water needed to transmit required moisture and heat to each of the individual rice grains, and to prevent the formation of the excess free starch point, i.e., the "glue" point at which too much free starch is released, thereby causing the rice to accumulate, and to no longer move through the processing steps. This is accomplished by adding water in quantities which are roughly equivalent to the amount that the rice can absorb at each particular point in the process. Therefore, increases in pressure and temperature will allow for smaller amounts of water to be used in processing the cereal grains, while achieving a desired level of gelatinization of the cereal grains without release of excess free starch.

Figure 1:
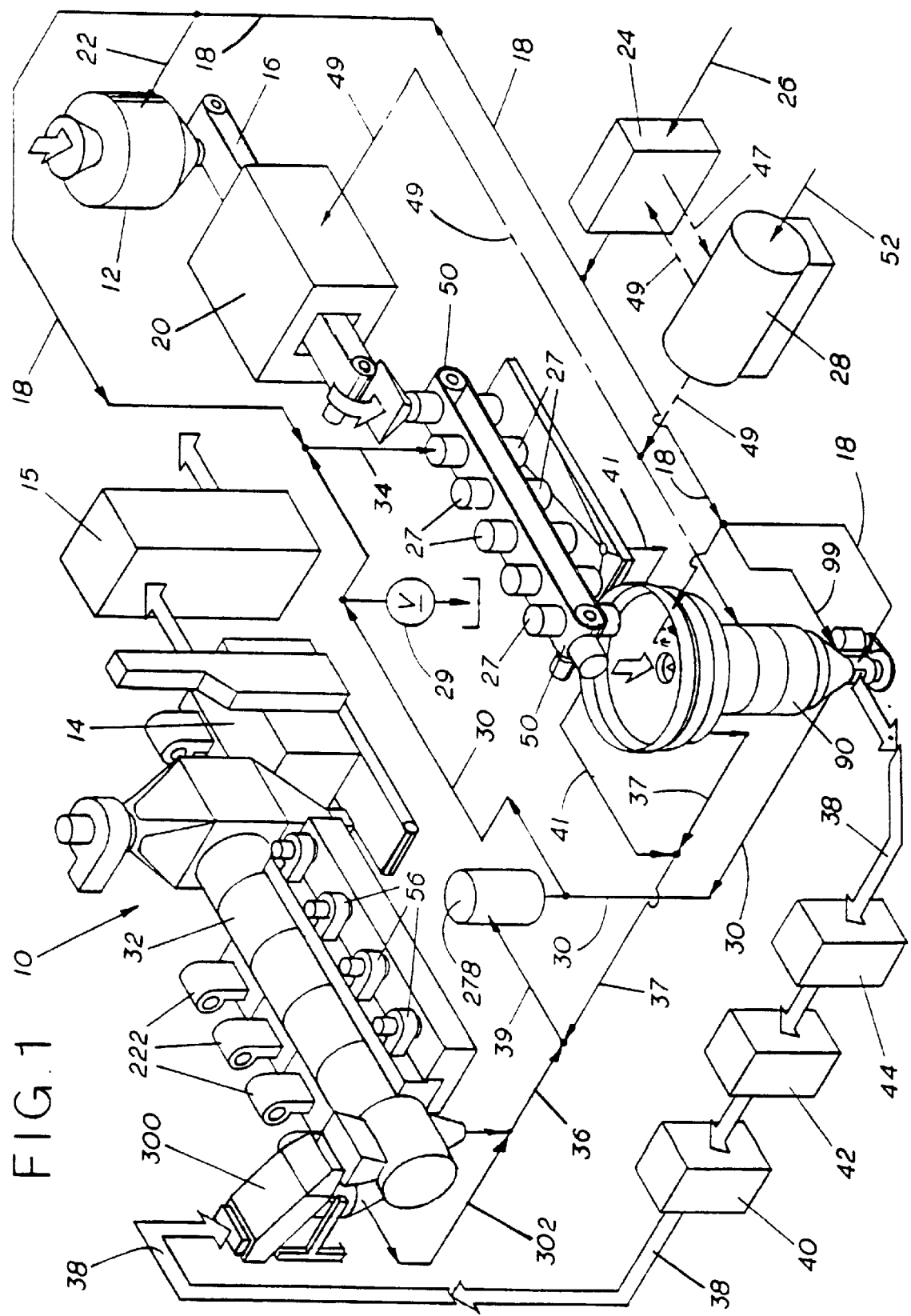
FIG. 1 is a perspective view of the overall food processing system.
Figure 2:
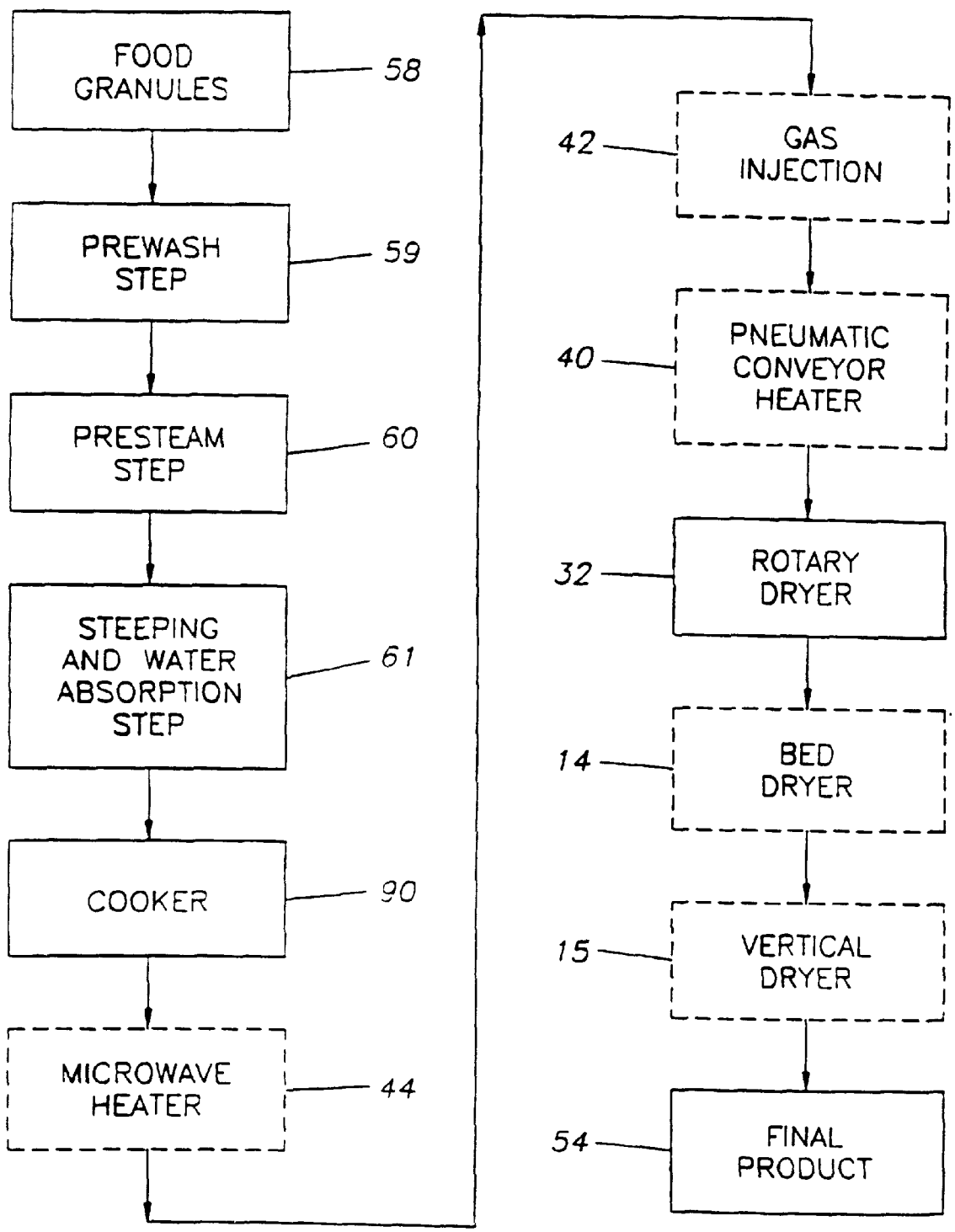
FIG. 2 is a flow chart showing the movement of the food granules among the various processing steps of the present invention.

The overall processing system can be seen in FIG. 1. In FIG. 2, a flow diagram depicts an overview of the typical flow of food granules through the processing steps of the present invention. All these steps will be explained in greater detail below, flow diagram is provided as an overview to the process. Food granules 58 are first subjected to a prewash step 59 in apparatus 12 illustrated in FIG. 1. After prewashing, food granules are provided to a presteaming step 60 (shown by reference numeral 20 in FIG. 1), where they are presteamed in preparation for steeping and water absorption step 61 which occurs within moving tanks or buckets 27 (as seen in FIG. 1). of course, the buckets 27 seen in FIG. 1 are merely schematic, and actual implementation of the conveyor containers may adopt a different appearance from that shown in FIG. 1, while still performing the same function. After steeping, the food granules proceed into steam cooker 90, where they are cooked, and are then provided along conveyor line 38 from the steam cooker to one or more optional stations. As one option, a microwave or radiowave heater 44 may be provided in-line, and a gas injection 42 may be provided to the food granules. Further, an optional pneumatic conveyor heater 40 may apply heat to the food granules.

Upon exiting the cooker and proceeding through conveyor line 38, the food product is preferably entrained in a water slurry, which proceeds into vibratory drainer 300 where water is drained from the slurry. The food granules then enter the rotary dryer 32, where the food granules are dried in various temperature zones. Further, in an optional step the food granules may be provided to a bed dryer 14, or a vertical dryer 15, or both, and the final product 54 (see FIG. 2) is dried and ready for packaging.

Referring back to FIG. 1, food processing system 10 includes prewasher 12 which receives the uncooked food granules, and performs a prewashing step. Input 22 provides water to the prewasher 12 which is preferably ambient temperature at a temperature of approximately 25° C. If desired, the prewasher may be supplied with a hot or cold water input, not shown in FIG. 1. A hot water input might be used in cases where it is desired to optimize free starch or surface starch removed. Prewashing may occur using any of the standard methods of prewashing rice known in the art. The preferred method is the so-called "Jiff-Rice" system, disclosed in Patent Bulletin No. 51-22063 and in Japanese Patent No. 57/141257, which are incorporated by reference.

In general, a Jiff-Rice unit prewashes rice by using a rotating centrifugal water application and separation method. Basically, the rice is washed in water, and the water is thrown off of the rice by centrifugal force in the turning of a centrifugal drum within the prewasher. In the prewasher 12, rice typically is washed for only about 10 to 60 seconds. If the Jiff-rice process is not being employed, 10 seconds is the preferred time. If the Jiff-Rice system is employed, then the washing time may be as much as 60 seconds or perhaps even more. This prewashing is known in the art pursuant to the above-described patents, and perhaps other patents.

The prewashing serves to provide some moisture to the rice, without giving it too much moisture in the early stages of the process. If rice or other uncooked food granules are given too much water early in the process, undesirable gluing effects will be observed, slowing the transport of the food granules through the cooking apparatus.

After the relatively brief prewashing step, food granules are deposited upon conveyor 16 for transport into the presteamer unit 20, which is supplied with steam from steam line 49. The presteamer is preferably a bed conveyor-type steam unit, of the type known in the art which sprays steam onto the bed of food granules as they pass through the steamer from above the conveyor down onto the conveyor, and also from below the conveyor onto the food granules. The presteaming step is important to the overall invention because the food product is exposed to a relatively brief amount of heat and moisture, in order to avoid damaging or mobilizing surface starch in the early stages of cooking of the food granule. In the preferred method, each individual granule of rice will be subjected to the presteamer operation for approximately 5 to 30 minutes. Of course, this may be modified as desired, and presteaming time will depend upon the variety of the product being produced.

The presteaming step assists food granules, and in particular, assists cereal grains such as rice in absorbing a relatively small, but appropriate, amount of water at this point in the process. This step, therefore, prepares the rice granules to be in a condition for absorbing further quantities of water in appropriate amounts in subsequent steps. In the process of the present invention, one of the most important factors is that the cereal grains are presteamed before they are steeped in the buckets 27 in route to the steam cooker. This process facilitates a controlled moisture input into the food granules or cereal grains that increases the ability of the food particle to be cooked without showing undesirable gluing effects. In particular, the water which is transported along with the cereal grains during cooking is less likely to contain large amounts of loose starch which has been extruded from the cereal grains where a presteaming and a short steeping step are provided, as in the present invention, before steam cooking the rice.

After the food granules pass through the presteamer unit 20, they are deposited into buckets 27 which are intermittently advanced upon conveyor line 50. The prepared conveyor/bucket system is of a commercially available design from Nippanki Industrial Co., Ltd. of Japan. Preferably, approximately 50 pounds of food granules are deposited into each bucket along conveyor line 50. Sensing mechanisms (not shown) detect when the bucket receives a full load of food granules, and at that point the conveyor system advances one station to a point at which the dispenser line mixture 34 dispenses water into the bucket 27, for a steeping step.

The dispenser line mixture 34 may be comprised of fresh hot water which comes from hot water line 18, or may be comprised of recirculated water from recirculated water line 30. Depending upon the type of food granules processed, and the processing conditions required, it may be possible to provide recirculated, or recycle water, from recirculated water line 30, which has already been processed, back into buckets 27 for reabsorption by food granules, thereby minimizing the amount of water used in the overall processing system, and reducing the amount of waste water which is excreted in the overall processing of the food granules.

The amount of water introduced into each bucket 27 is typically the amount of water needed to provide a ratio of about 1:1 between the amount of food granules introduced into the bucket, and the amount of water introduced into the bucket, on a weight basis. In particular, the amount of water introduced is regulated such that it may be completely absorbed, or nearly completely absorbed, by the food granules before they are deposited into the steam cooker 90.

The steeping water provided into buckets 27 is preferably about 80° C., although the water temperature will vary for different processing conditions and different food granules. Further, in the processing of rice, different varieties of rice may require a different water temperature for steeping. Each 50 pound charge of food granules which is deposited into bucket 27, and then supplied with water, then proceeds in stepwise fashion towards the steam cooker 90. Preferably the rice will remain in its associated bucket and hot water for approximately 5–30 minutes (depending upon processing conditions and variety of food product). The preferred time for milled white rice is about 10 minutes for appropriate steeping and absorption of the water into the rice granules. Upon reaching the steam cooker, the contents in each bucket are emptied into the steam cooker, and each bucket is returned back to the deposit station along the undercarriage of the conveyor line 50. A bucket cleaning station may be included if needed.

After proceeding through the steam cooker 90, which will be described in more detail in the description that follows, the cooked rice and water slurry emerges along conveyor line 38, where it advances to a vibratory drainer 300, and then to a rotary dryer 32. However, one or more optional steps may occur between the steam cooker and the rotary dryer, including the application of microwaves, radiowaves, or other electromagnetic radiation to the food granules at microwave heater 44. As another option, the food granules may be subjected to a gaseous substance, such as carbon dioxide at gas injection station 42. As another option, depending upon the type of food granules processed, a pneumatic conveyor heater 40 may be provided to flash off excess water prior to entry of the food granules into the rotary dryer 32.

Further, chemical treatments of the rice may be desirable in some cases. The food granules may be conditioned by the addition of lecithin, rice oil, sugar, phosphoric acid, adipic acid or other acids. In the processing of rice, for example, such chemical additives are useful in improving the quality of the final product.

It should be noted that the gas injection and the microwave heating may serve several functions, including drying the surface of the food particles to facilitate the entry of water into the particle, thereby softening the food granule. In the case of rice, for example, microwave heating of the grain produces small fissures in the exterior of the grain, allowing for moisture entrapment within the grain during cooking, providing a highly desirable rice product. Carbon dioxide gas may be provided to cereal grains in order to improve the texture and to aid gelatinization of the starch within the grain for a more consistent cereal grain product that is more evenly cooked and more desirable to consumers. Due to the nature of the functions provided by these steps, they might be performed, either individually or in combination, or at other additional or different points in the overall process.

Upon arriving at rotary dryer 32, the food product is exposed to hot air in a manner to be described in greater detail below. An alternate type burner might also utilize sonic energy to aid drying. The food granules proceed through the rotary dryer, and optionally may proceed into a bed dryer 14. Whether or not a bed dryer is required will depend upon the type of food granule processed, and the degree of drying desired. After drying in the bed dryer, food granules may optionally proceed to a vertical dryer 15. Vertical dryer 15 is adapted for reducing the moisture content of food granules to a greatly reduced level. Both the bed dryer and vertical dryer are of conventional design.

Various aspects of the overall process will now be examined in greater detail.

The Preferred Embodiment of the Steam Cooker

Figure 2A:
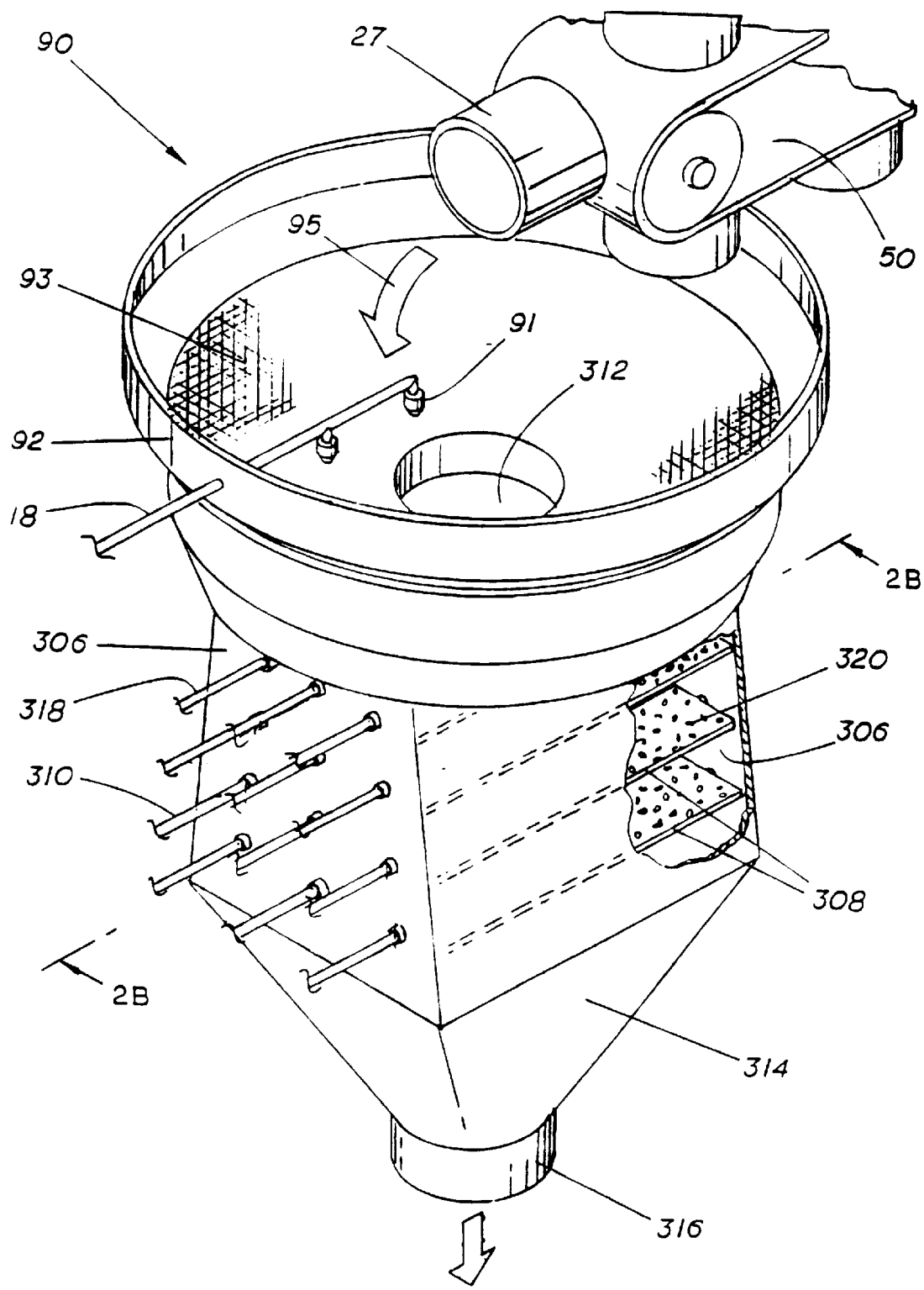
FIG. 2A is a perspective view of the preferred embodiment of the steam cooker of the present invention.

Steam cooker 90, the preferred embodiment for steam cooking in the present invention, is shown in FIG. 2A. The food granules, which have absorbed water just prior to entry into the steam cooker, proceed along conveyor line 50 as seen at the top of FIG. 2A. The food granules, with absorbed water, are deposited from bucket 27 into the top portion of the steam cooker 90. Further, hot water line 18 provides hot water to hot water line 99 to the lower section of the steam cooker 90, and this water may be used to flush the food granule slurry out of the steam cooker, and to provide an aqueous medium of transport of the slurry to the rotary dryer. (See FIGS. 3–5).

Flow direction arrow 95 shows the direction of flow of the uncooked food granules into the steam cooker. A hot water line 18 provides hot water for cleaning jet nozzles 91 which are located in the top portion of the steam cooker 90. The food granules are deposited onto drain screen 93, where they are vibrated, and moisture is allowed to drain from the food granules prior to their passage through steam chamber aperture 312 seen at the top and center portion of FIG. 2A. The circular retention bowl 92 receives the food granules, and directs them downward into the steam chamber aperture 312 with the vibrational action of the drain screen 93.

The food granules proceed through steam chamber aperture 312 into the lower portion of the steamer as seen in FIG. 2A. A plurality of steam lines, for example steam line 318 and 310, are seen entering the steamer wall 306, where they provide steam to the food granules on the interior of the steamer 90. Rotating shutters 308 are seen in cut-away view and in phantom lines at the middle and lower portion of FIG. 2A. The rotating shutters 308 are rectangular in shape, and extend between the side walls of the steamer, and contain steam ports 320 upon their upper surface. Food granules proceed through the various stages, or layers, of rotating shutters in stepwise fashion, where they eventually are released into hopper 314, seen at the lower portion of FIG. 2A. The hopper is typically a water filled bath which cools the food granules, and provides a slurry medium in which food granules proceed prior to advancement through exit chute 316 out of the steam cooker 90. Water lines, gas lines or vacuum lines may be provided in the region of the exit chute 316 to facilitate the discharge of food products from the cooker. Such equipment is more fully discussed in connection with the embodiment of FIGS. 3–5, but could preferably be employed in this embodiment as well.

Figure 2B:
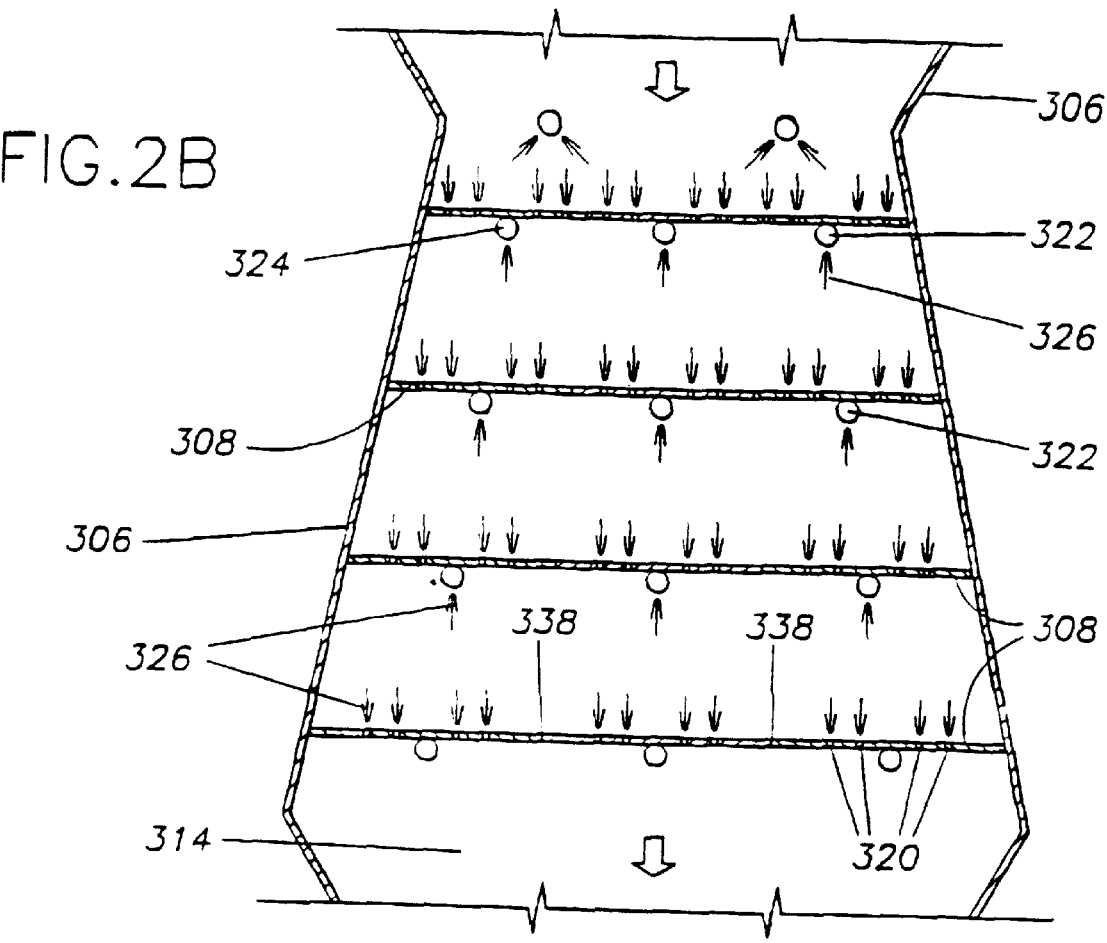
FIG. 2B provides a cross-sectional view of the preferred steam cooker of the present invention.
Figure 2C:
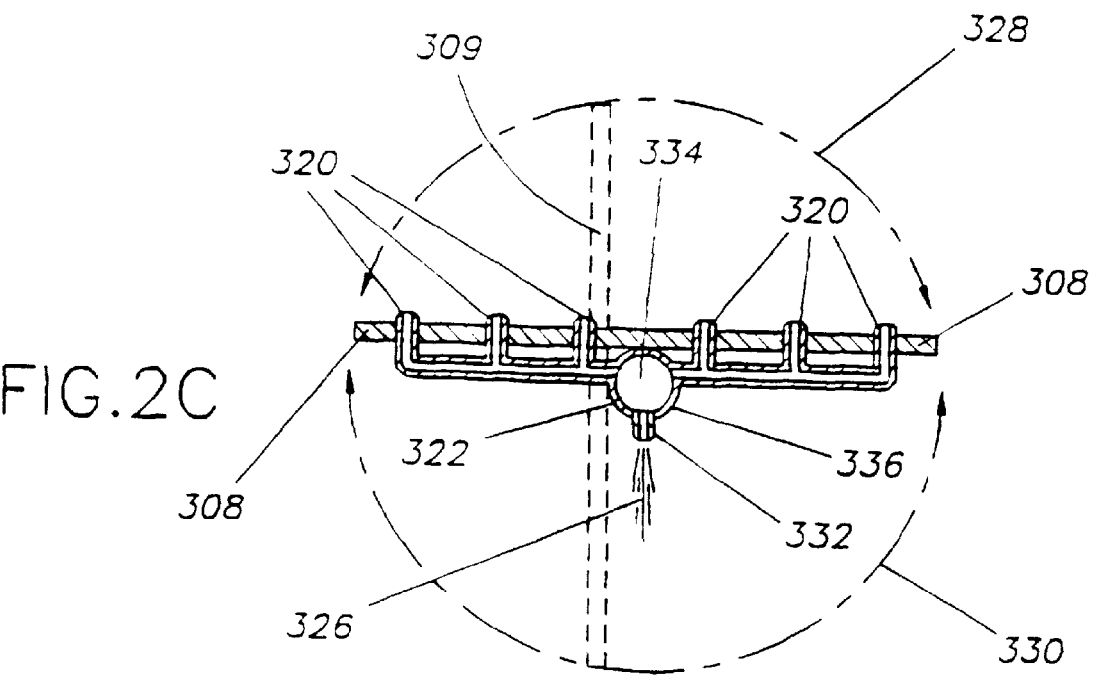
FIG. 2C provides a detailed view of the shutters contained within the preferred steam cooker of the present invention (the steam cooker disclosed in FIGS. 2A and 2B)

FIG. 2B shows a cross-section of the lower portion of the steam cooker previously described in FIG. 2A. At the top of FIG. 2B, the steamer wall 306 is seen on either side of the figure, with four vertically spaced layers, or rows, of rotating shutters 308 extending laterally between steamer walls 306. FIG. 2B shows the preferred embodiment of the invention, that is, a series of rotating shutters 308 to advance the food granules from one stage to the next in sequence. Further, it may be seen that the lower portion of the cooking apparatus seen in FIG. 2B is somewhat wider than the upper portion, allowing for greater throughput of the food granules, with maximum cooking effectiveness and minimum adverse "gluing" effects, and also to allow for swelling of the food product, such as rice, due to the absorption of water. Perforated steam lines 324 are seen in cross-section in FIG. 2B, where they proceed laterally beneath rotating shutters 308. The perforated steam lines serve two functions. First, they provide steam for the cooking of the food granules. Second, they provides axes or hinges of rotation for the rotating shutters 308. Shutter gap space 338 is the operating gap between rotating shutters 308, and it facilitates free rotation of the shutters, while still retaining food granules within each layer of the steam cooker. FIG. 2C, which is discussed in more detail below, shows the rotated position of the shutter 309 seen in phantom lines in FIG. 2C. Each of the shutters seen in FIG. 2B functions by rotating as shown in FIG. 2C.

Perforated steam lines 322 and 324 in FIG. 2B provide steam to cook food granules. Further, steam jet 326 extends downwardly and somewhat laterally from the perforated steam lines, and steam ports 320 are evident on the top side or upper side of each rotating shutter 308, to provide steam upward into the food granules. In this way, each charge of food granules is steamed from above and below as it proceeds in stepwise fashion through the steam cooker.

FIG. 2C shows a closeup view of one rotating shutter 308 and its associated perforated steam line 322. In particular, it may be seen that steam ports 320 exist upon the upper side of the rotating shutter 308, and steam is allowed to exit these ports. Steam conduit 334 carries steam through the center of the perforated steam line 322. Outer steam line wall 336 serves as a pivot point, or hinge, upon which the rotating shutter 308 may turn on its axis approximately 90°. The rotated position of the shutter 309 is seen in the phantom lines extending from the top to the bottom of FIG. 2C. Steam conduit 334 carries the steam from the exterior of the steam cooker to the steam jet nozzle 322 and the steam ports 320. Steam jet 326 is seen as it exits from the steam jet nozzle 332. The axis of rotation of rotating shutter 308 is shown by arrows at axis 328 and axis 330.

In the operation of the steamer seen at FIGS. 2A–2C, rice falls through aperture 312 and comes to rest on top of the uppermost row of closed shutters 308. While in this position, steam is provided to the rice for an appropriate duration of time from steam ports 320 and 322. The shutters will then be rotated to cause the rice to fall and be collected on the immediately adjacent vertically spaced row of closed shutters, where the rice will be subjected to further steam and cooking. The rice will then proceed through the cooker onto each immediately adjacent row of shutters for being subjected to further steam, until the rice has achieved the appropriate degree of cooking and moisture absorption.

The preferred operation is to rotate the rotating shutters by external activation approximately once per minute to minute and a half in the case of white rice. Other types of rice would use other processing conditions, and might require a longer or shorter period of time between actuation of the rotating shutters. Once actuated, the rotating shutters would rotate from a few degrees to as much as 90°, as necessary to facilitate the movement of the food granules from one stage (zone) down to the next zone. In actual practice, the steamer preferably would have approximately 10 zones, upon which food granules would proceed in stepwise fashion through rotating shutters. For illustrative purposes, only approximately four or five zones are shown in FIGS. 2A–2C. Different types of food granules and different varieties of rice might require a different number of zones, and as few as two or three zones, or less, might be required for certain applications, while as many as 30 zones might be desirable in other applications.

The actuating method for the rotating shutters may be accomplished by using a motor, hydraulic equipment, or perhaps pneumatic air equipment. The total residence time of rice in the steamer is approximately 5 to 30 minutes, in the case of long grain white rice. It is less or more for other varieties of rice, and for other varieties of food granules. The residence time for short grain rice (i.e., faster hydrating rices) is likely to be less, while the residence time for slower hydrating rices, such as parboiled and brown, and wild rice is likely to be greater. In the case of long grain white rice, the weight of rice to be held by each rotating shutter in each stage (preferably) is approximately 2.8 kilograms. Further, the thickness of the rice layer, in the case of long grain white rice, would preferably be approximately five centimeters. In order to secure the dropping of rice by turning the rotating shutters, the thickness of the rice upon the top of each rotating shutter would preferably be smaller than the rotating radius of the rotating shutter 308, to facilitate the movement of rice from one zone down to the next zone. In some applications, it may be desirable to feed rice or food granules out of the steam cooker and directly into a rotary dryer. However, in the preferred embodiment, and as seen in FIG. 1, it is believed that pumping the rice from the steam cooker in the form of a slurry, into a vibratory drainer 300, and then into the rotary dryer is the most efficient method for the processing of rice. The processing of food granules, and different varieties of rice, may occur by different methods.

In the preferred operation, the pressure within the cooker will be kept below 15 psi in order to avoid high pressure regulations which are imposed upon such high pressure vessels. As the rice exits the cooker, its water content will be approximately 50%–65% water. These general conditions will apply not only to this preferred embodiment, but also the other embodiments of cookers as well.

Figure 3:
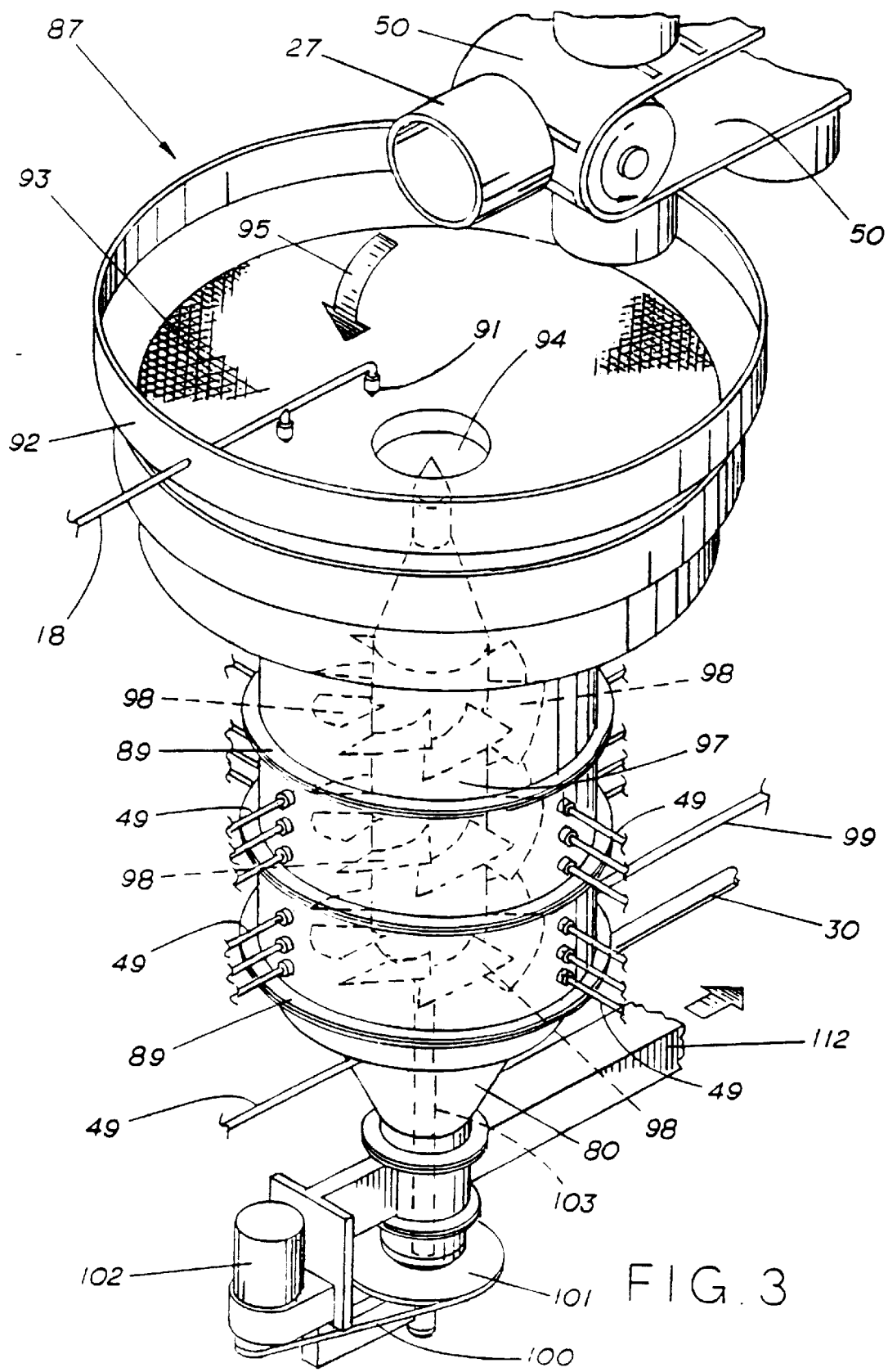
FIG. 3 is a perspective view of a first alternate embodiment of the steam cooker of the present invention.

Alternative Embodiments of the Steam Cooker Using a Central Rotating Mechanism FIG. 3 shows an alternate embodiment for the steam cooker of the present invention. In FIG. 3, steam cooker 87 is shown, and the food granules, which have absorbed water just prior to entry into the steam cooker, proceed along conveyor line 50 as seen at the top of FIG. 3. In this alternate embodiment, the food granules, with absorbed water, are dumped from bucket 27 into the top portion of the steam cooker 87. Flow direction arrow 95 again shows the direction of flow of the uncooked food granules into the steam cooker. A hot water line 18 provides hot water for cleaning jet nozzles 91 which are located in the top portion of the steam cooker 87, and also provides hot water to hot water line 99. The food granules are deposited onto drain screen 93, where they are vibrated, and moisture is allowed to drain from the food granules prior to their passage through food granule inlet 94, which is seen at the top and center portion of FIG. 3. The large circular retention bowl 92 receives the food granules, and it directs them downward into the food granule inlet 94 with the vibrational action of the drain screen 93.

Different processing conditions and different types of food granules will determine what type of steam cooker is most desirable for each application. For example, the preferred embodiment of the present invention is the steam cooker shown in FIGS. 2A–2C, and it is preferred for long grain white rice. Nevertheless, short grain rice or other varieties of rice, such as parboiled rice, may be more advantageously cooked using the rotating mechanism of the steam cooker shown in FIGS. 3–5, or perhaps in the alternate embodiments seen in FIGS. 6–12. Each of the steam cookers shown in this specification is contemplated as part of this invention, and different varieties of food granules will preferably use different variations of the steam cooker.

Food granules are deposited into the housing 89 which contains the propeller assembly 97 (the cylindrical dotted portion seen at the center of FIG. 3). The propeller assembly 97 comprises several parts, which will be seen in the exploded and detailed view of FIG. 4.

Steam lines 49 provide steam to the exterior wall of housing 89 as seen in FIG. 3. Further, rotary blades 98 are seen in phantom lines at the center of FIG. 3, as part of the propeller assembly 97. Hot water line 99 provides hot water to the hopper 80, which may be used to flush the food granule slurry from the hopper, and to provide a water transport means to the rotary dryer. Recirculated water line 30 also extends into the housing 89.

At the lower portion of FIG. 3, steam line 49 is seen entering the housing, and hot water line 96 provides hot water to the lower portion of the steam cooker comprising the hopper 80. At the lower portion of FIG. 3, in phantom, can be seen the rotating crank shaft 103. The rotating crank shaft 103 is connected to the propeller assembly 97, and it rotates, causing the rotation of the rotary blades 98.

During operation of the steam cooker, the rotary blades 98 act to propel the food granules from the top of the cooker down to the bottom of the cooker. The blades also support the food granules, and provide a uniform mixture of food granules while the granules are being steamed in the steam cooker. Further, the rotating action provided by rotating crank shaft 103 assists in preventing the gluing and sticking together of the food granules, which may otherwise occur.

Support frame 112 supports the steam cooker, and power is provided to the rotating crank shaft 103 by way of motor 102, which is connected to a belt 100 wrapped around a pulley 101.

Figure 4:
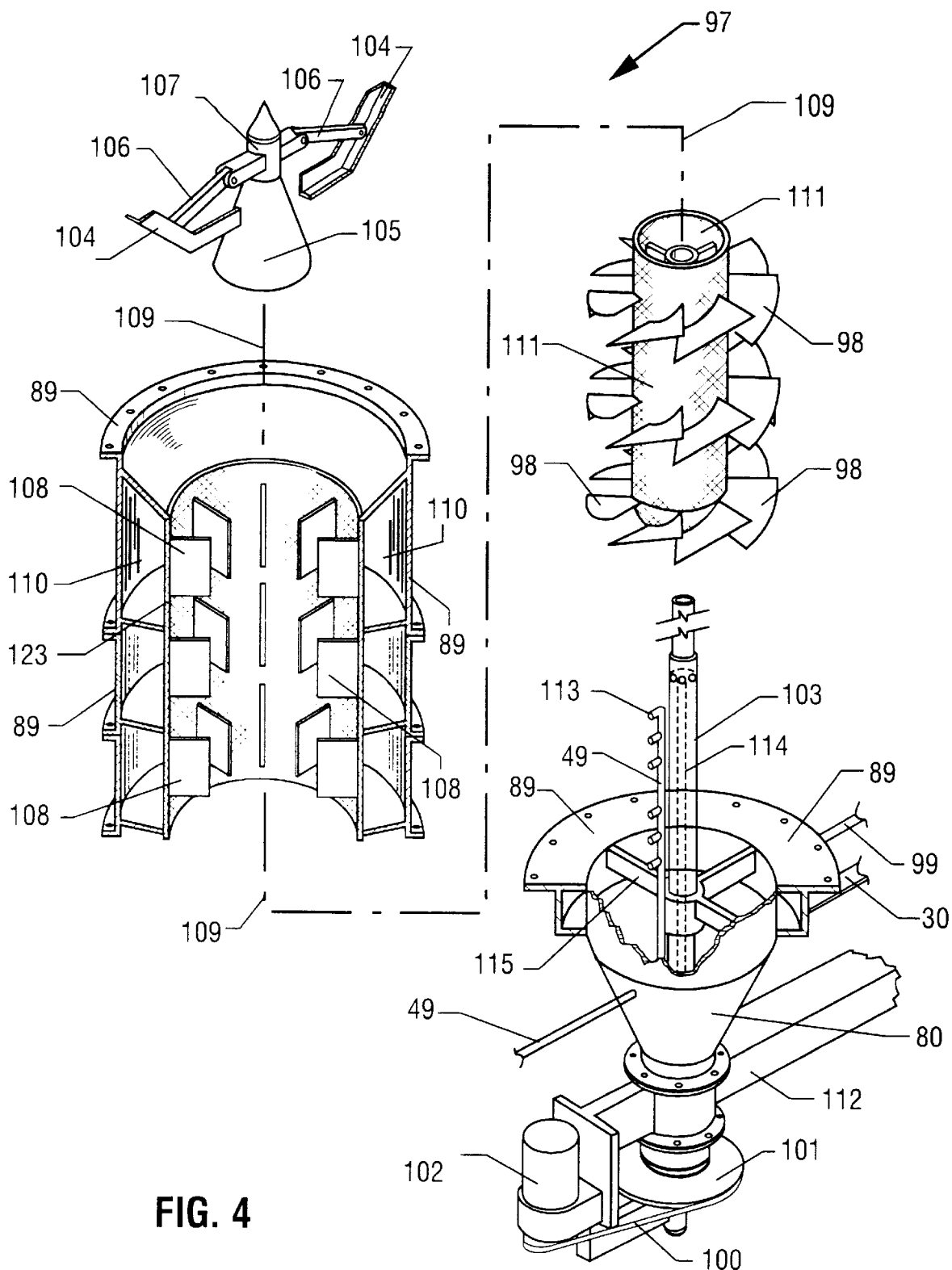
FIG. 4 provides an exploded, detailed view of the interior of the alternate embodiment of the steam cooker shown in FIG. 3.

In FIG. 4, an exploded and detailed view of the propeller assembly 97 is provided. The central axis 109 of the propeller assembly is seen as dotted lines. FIG. 4 also shows a rotating scraper cap 105 upon which is mounted an optional scraper connecting unit 107, only part of which is shown in FIG. 3. The scraper connecting unit 107 is connected to two separate scraper arms 106, which in turn are connected to scrapers 104. The rotating scraper cap 105 is fixedly connected to the rotating crank shaft 103 which extends up through the entire assembly as shown in FIG. 4. The scrapers rotate to effect a uniform distribution of the food granules as they enter the interior of the steam cooker 90.

At the center and left portion of FIG. 4, the housing 89 is seen in cut-away view whereby the stationary blades 108 may be seen on the interior wall of the housing 89. Twelve stationary blades are shown on the cut-away section, which comprises approximately one-half of the entire housing 89. Steam chamber 110 may be seen on the exterior periphery, and it is within the steam chamber 110 that steam is injected by way of steam lines 49 and then distributed inward through porous wall 123. Porous wall 123 may be formed, for example, by a cylindrically shaped portion of steel or aluminum mesh.

Further, in FIG. 4, the rotating cylinder 111, which is connected to the rotating crank shaft 103 is seen at the top right portion of FIG. 4. It rotates within the housing 89, and comprises a plurality of rotary blades 98 which are arranged in three distinct zones along the longitudinal length of the rotating cylinder 111. The rotary blades 98 assist in advancing the food granules through the cooking apparatus, and also provide a platform upon which the food granule slurry may rest, to prevent the pressure of the slurry from becoming so great that large globules are formed within the chamber. Thus, rotary blades 98 and stationary blades 108 help to keep the food granule slurry both supported and mixed, to prevent globular portions from forming within the steam cooker 90.

The rotating cylinder 111 is mounted upon the rotating crank shaft 103 which extends along the central axis 109 up through the rotating cylinder 111 where it engages the rotating scraper cap 105.

Steam water mist line 114 extends up through the interior of the rotating crank shaft 103 to provide a mixture of steam and water mist to the food granule slurry. Further, steam line 49 is provided with a plurality of steam nozzles 113 which are located along the interior of rotating cylinder 111, and provide jets of steam from the interior through the wall of the rotating cylinder ill and out into the chamber where the food granules are contained. Like exterior wall 123, rotating cylinder 111 is porous to permit the passage of steam. Thus, the food granules receive steam from two directions, from steam chamber 110 from the outside, and from the inside by way of steam nozzles 113, in order to achieve more uniform cooking and water absorption.

At the lower right portion of FIG. 4, one can see housing 89 which is shown in a cut-away view, and hot water line 99 extends out from the housing. Recirculated water line 30 drains excess water from the interior of the steam chamber and, as seen in FIG. 1, provides recirculated water for reabsorption along dispenser line mixture 34 back into buckets 27. In this way, less water is utilized in cooking, and more water is retained within the processing system.

Spoke 115 provides a structural member supporting the steam cooker, and a hopper 80 essentially comprises a water bath near the lower portion of the steam cooker upon which the rice falls after it is cooked. Steam line 49 enters the steam chamber through the wall of hopper 80. Hot water line 99 also provides hot water, if needed, to the hopper 80. In some cases, a hot water flush may be desirable to flush globules of food granules out of the hopper 80, and into conveyor line 38 for transfer to the rotary dryer 32. Power is provided to the rotating crank shaft 10 by way of motor 102, which is connected to belt 100, wrapped around pulley 101.

Figure 5:
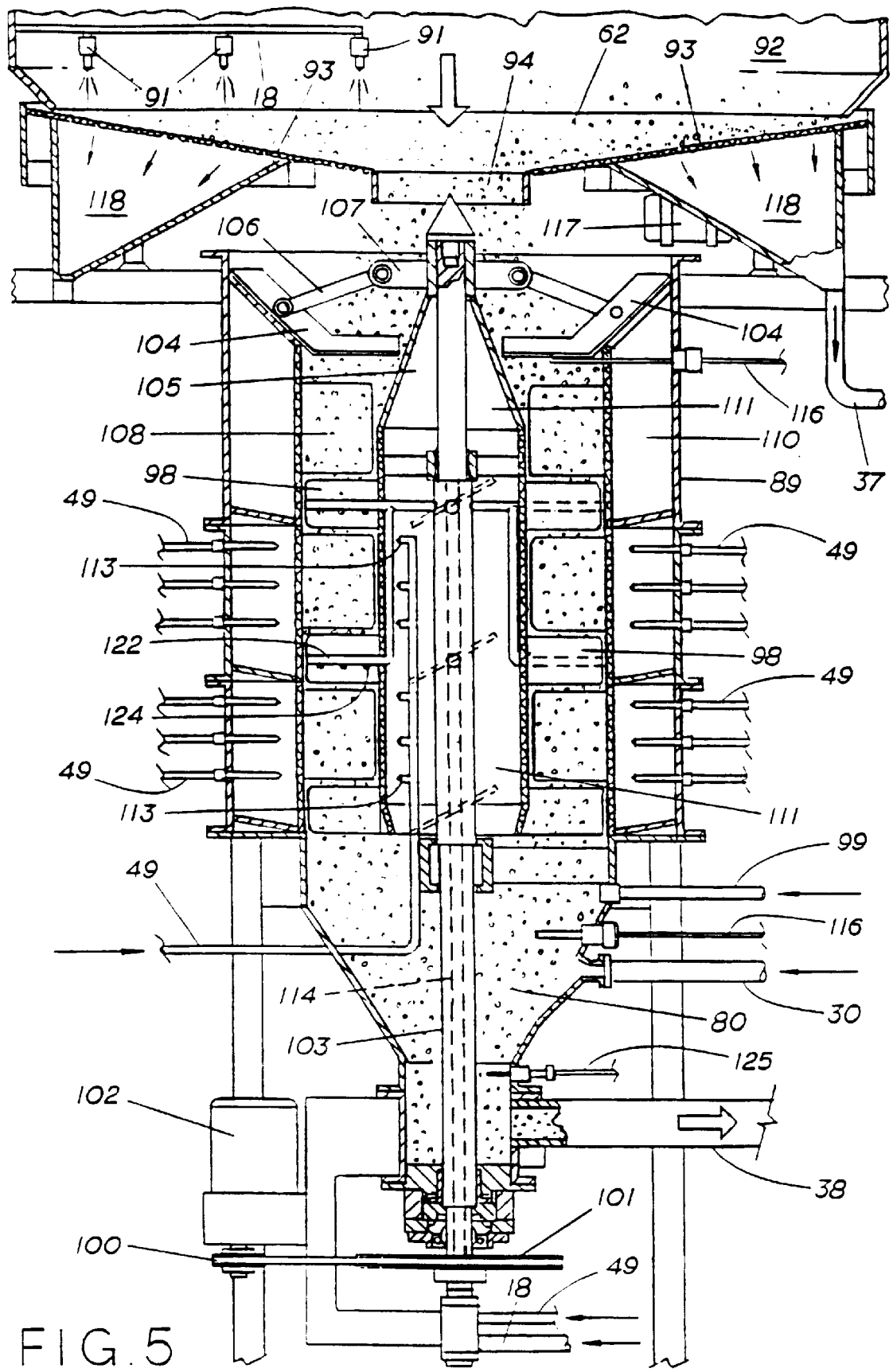
FIG. 5 discloses a cross-sectional view of the steam cooker shown in FIGS. 3 and 4.

FIG. 5 depicts a cross-section of the steam cooker shown in FIGS. 3 and 4. At the top of FIG. 5, uncooked food granules 62 are dumped into the retention bowl 92, where they are vibrated upon drain screen 93. Hot water line 18 is seen at the top of the retention bowl 92, where it provides a plurality of cleaning jet nozzles 91 that may be used to clean the screen or to provide a hot water spray upon the food granules if desired.

Vibration of the drain screen 93 is provided by vibratory motor 117, which provides vibrating action for the entire drain screen. Water is drained into drain space 118 around the periphery of the food granule inlet 94, and the water is collected and drained away through streamer drain line 37. As seen in FIG. 1, the contents of steamer drain line 37 is later filtered, and some portion of that water may be reused and reabsorbed along the dispenser line mixture 34 into bucket 27 (see FIG. 1). Also, some portion of this recirculated water may be drained at drain 29 as seen in FIG. 1.

FIG. 5 illustrates the manner in which the food granules proceed through the food granule inlet 94 as indicated by the arrow at the top. The granules are dispersed, and fall upon the rotary scraper cap 105, wherein scrapers 104 rotate in distributing the food granules, and helping to feed them into the steam cooker. Scraper connecting unit 107 is seen as it forms its connection between rotating scraper cap 105 and scrapers 104.

The food granules then proceed into the steam cooker in a continuous batch, and they are mixed and distributed with the assistance of stationary blades 108, which do not move, and rotary blades 98, which are rotated in three discrete zones as seen in FIG. 5, around the periphery of the rotating cylinder 111. The rotary blades contain on their underside a steam line 122, from which steam nozzles 124 provide steam to the food granules within the chamber. These steam lines 122 receive steam from water mist line 14.

Rotating crank shaft 103 rotates the rotating blades 98 at a relatively low rate of speed, in the range of 1 rpm to 10 rpm and preferably about 5 rpm. Care should be taken not to agitate the granules to any significant degree, so as to avoid breakage of the individual kernels. As a result, the rice proceeds through the cooking chamber, being steamed from the exterior by a plurality of steam jets around the circumference of the cooker, which are contained within steam chamber 110. Steam lines 49 are seen as they enter from the exterior of the steam cooker into the interior space of steam chamber 110.

Hot water line 99 is seen on the right side of FIG. 5, and level sensor 116 is slightly below hot water line 99. Below that can be seen recirculated water line 30, which may drain off excess water from the hopper 80 and provide it to be recirculated and perhaps reabsorbed in buckets 27 as seen in FIG. 1. Sensor 125 is seen below recirculated water line 30, and it operates to sense the temperature of the water to prevent the water temperature from becoming too great. This sensor may assist in minimizing starch damage and gluing effects.

As shown in FIG. 5, hopper 80 is seen as the portion of the steam cooker wherein the rice falls after it is thoroughly mixed and cooked. Steam line 49 is seen at the lower left portion of FIG. 5, and hot water line 96 is provided in the region of the hopper 80 to facilitate a hot water flush, if desired.

Motor 102 provides power generated by way of belt 100, which drives pulley 101, thus turning the rotating crank shaft 103. Steam line 49 and hot water line 18 are seen at the very bottom of FIG. 5, where they enter the region of the crank shaft 103 and proceed upward as seen in the dotted phantom lines along the interior of the crank shaft 103. The steam water mist line 114, which provides a steam water mist to the food granules within the chamber, may be adjusted to provide the desired mixture of water and steam which is necessary for cooking the particular variety of food granule. Some food granules may require more water and less steam, while others require more steam and less water to fully cook the granules prior to exit from the steam chamber.

In the preferred operation, rice will remain within the cooker 90 for approximately 10 to 15 minutes, approximately the same amount of residence time as in the steeping operation. Thus, the steeping and cooking operations may be coordinated. While the rice is in the cooker, it will continue to absorb water in an optimal manner, i.e., in an amount roughly equivalent to the amount of water that can be absorbed by the granules at that point in the process, and the starches are gelatinized. The temperature and pressure within the cooker will be coordinated to achieve optimal results for cooking the rice while avoiding undesirable "gluing" or sticking.

Further Alternate Embodiments of the Steam Cooker

In general, it should be noted that numerous embodiments of steam cookers may be used in the present invention. Different arrangements of the cooker will be preferred for different types of food granules, and different varieties of cereal grains or different varieties of rice may require variations in the design of the steam cooker to maximize cooking effectiveness.

Figure 6:
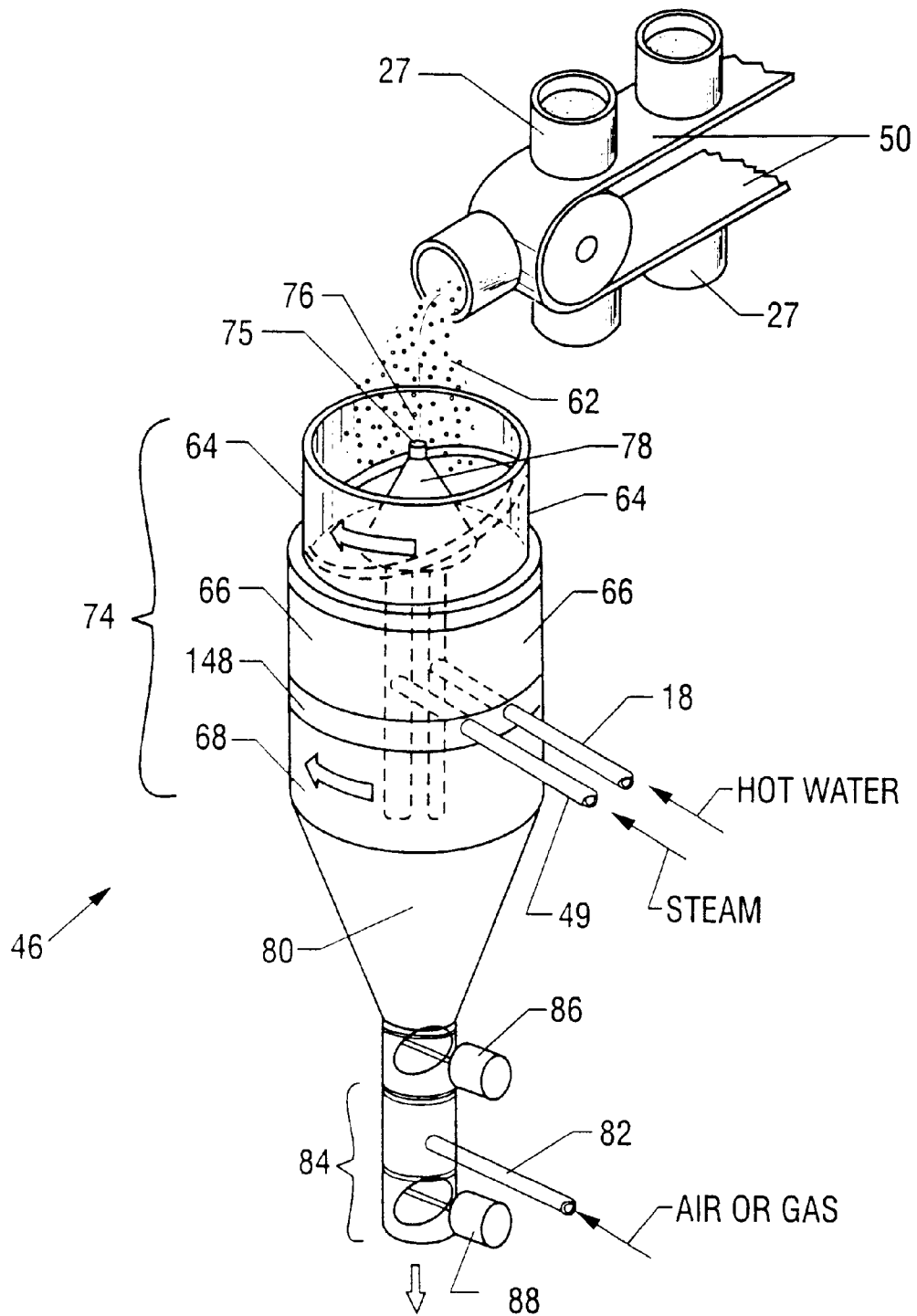
FIG. 6 is a perspective view of another alternate embodiment of a steam cooker of the present invention.

FIGS. 6–8 illustrate an alternate embodiment of the present invention, which also may provide advantageous results for steaming certain types of food granules such as certain varieties of rice. Bucket 27 is seen at the top of FIG. 6 where it proceeds along conveyor line 50, dumping a load of uncooked food granules 62 into the top portion of the steam cooker.

The granules are deposited into a funnel segment 64 at the upper end of the steam cooker. The uncooked food granules 62 preferably will free-fall upon cone spreader 78 where the food granules are distributed in an even fashion around the periphery of cone spreader 78. Further, funnel segment 64 may be selectively rotated to assist in the even distribution of food granules around its periphery, thus assisting in the uniform and complete cooking of food granules. The rotation could be clockwise or counter-clockwise, and in the preferred embodiment, the rotation of the funnel segment 64 would be in the same direction (i.e., clockwise or counter-clockwise) as the rotation of the discharge segment 68.

In the steam cooker 46, cylindrical housing 74 is comprised of a plurality of segments, including funnel segment 64, middle segment 66, and discharge segment 68. Pipe entry segment 148 is located between the middle segment 66 and the discharge segment 68 in the preferred embodiment as seen in FIG. 6. Through segment 148, hot water line 18 and steam line 49 enter the cylindrical housing 74, as seen in FIG. 6. The food granules proceed through the segments, and they are picked up by the rotating discharge segment 68 as it turns on its central axis. The food granules proceed into hopper 80, and then fall into venturi segment 84.

The flow rate of food granules through the steam cooker may be inhibited, especially near the discharge end of the steam cooker at hopper 80. To encourage free flow of food granules through the hopper, and especially in the case of cereal grains or rice products, which may exhibit a gluing effect which prohibits advancement of the rice grains through the steam cooker, the venturi segment 84 may be provided with an air or gas feed line 82 (which could alternatively provide a vacuum) that provides air or gas pressure (or a vacuum) to assist in the advancement of the food granules from the butterfly valve 86 to exit the steam cooker through butterfly valve 88.

The rotation of various segments of the cylindrical housing in the alternate embodiment, as seen in FIGS. 6 and 7, provides for greater uniformity of cooking and distribution of food granule flow through the steam cooker. In the case of cereal grains, once the cereal grains pass into the steam cooker, the goal is to cook the grains at the lowest possible moisture content to reduce the amount of time required in the steam cooker. A reduction in the moisture level and the time required for cooking is advantageous, but the reduction in moisture level must not be so great as to cause undesirable gluing effects within the cavity of the steam chamber. This principle applies not only to this embodiment, but to all in this disclosure.

Typically, only a small amount of pressure is achieved within the steam chamber of FIGS. 6–12, as in the preferred embodiment shown in FIGS. 2A–2C, and the alternate embodiment seen in FIGS. 3–5; the pressure is preferably maintained below 15 psi to avoid the necessity for complying with governmental regulations and local codes for pressurized vessels. This, of course, is only preferable and may be modified as desired or needed. The pressure is maintained by the downward force of the rice within the vessel and by the introduction of steam under pressure into cooking chambers.

A small opening 75 at the top of conical section 78, as seen in FIG. 6, permits steam to escape from within the cooking vessel, but the opening is sized to restrict the escape of steam in order to achieve the desired interior pressure.

The vessel is typically operated at a pressure of approximately 5 psi, but this may be varied as desired. A greater pressure within the steam chamber will increase the temperature of the chamber, without a corresponding addition of moisture. Thus, the primary variables in the cooking of food granules are the pressure, the temperature, and the moisture content of the food granule slurry.

In the embodiment shown in FIG. 6, there is synchronized rotation between the discharge segment 68 and the funnel segment 64. Hot water is provided through hot water line 18 at a temperature of between 90° C. and 100° C. It is preferred that the cooker be arranged vertically, so that the flow of food granules through the cooker is assisted by gravity. The average time a particular food granule resides in the steam cooker itself is preferably about 10 to 15 minutes, although cooking times will vary widely for different types of food granules. A synchronized rotation between segments 64 and 68 of about 5 revolutions per minute is the maximum typically used; the minimum rpm of the rotating segments is 0.2 rpm.

In FIG. 7, an exploded view of the cooker of FIG. 6 is shown. Steam jet 76 emerges from the top of cone spreader 78 in the funnel segment 64. Funnel segment 64 rotates, preferably in synchronous rotation with discharge segment 68. Along the central axis of the steam cooker is central hot water line 138 and central steam line 140. These two lines provide hot water and steam to the cooking chambers 142 which are arranged around the periphery of middle segment 66.

The cooking chambers are preferably separated by partitions 143, although it is not required that the chambers be separated in such a way. Pipe entry segment 148 is located between middle segment 66 and discharge segment 68, and it provides for entry of the hot water line 18 and steam line 49 from the exterior of the steam cooker into the plenum chamber 144, which is the chamber running along the center of the steam cooker from which steam and hot water emanates into the cooking chambers radially outwardly. Discharge segment 68 is provided with a spreader window 154 which, when the discharge segment 68 is rotated, provides a uniform distribution and spreads the food granules in an even manner as they emerge from the various cooking chambers 142.

Spreading of the food granules in this way provides for more uniform cooking, and a more advantageous distribution as the food granule slurry proceeds through the processing of the present invention. Hopper 80 collects food granules and they are discharged through venturi segment 84, which comprises butterfly valve 86 and butterfly valve 88. Air or gas may be provided along air or gas feed line 82, and a vacuum may be pulled to provide a venturi effect which may advance food granules out of the steam chamber more efficiently.

In FIG. 8, a pie-shaped section of a cooking chamber 142 is seen in expanded view, which shows two partitions 143, the exterior wall 146 and the perforations 152 on the interior perforated wall 150. Hot water and/or steam may be provided through perforations 152 to the food granules residing in cooking chamber 142. Additionally, openings may be provided in the exterior wall 146 to receive hot water and/or steam from a supply plenum (not shown). In this manner, steam is provided from two different directions in order to provide more uniform cooking and to better regulate the water supply and absorption.

In operation of the embodiment shown in FIG. 7, rice is conveyed in buckets 27 by way of conveyor 50 to the funnel segment 64, where it is deposited into the funnel segment. Food granules will accumulate in each chamber and will be subjected to an internal pressure of 5–15 psi. A typical residence time of the food granules within a chamber will be approximately 10 to 15 minutes, although this can be varied as desired. Most preferably, steam will be supplied both from the openings 152 (FIG. 8) and from openings in the exterior wall 146, in order to achieve as much uniformity in the exposure of each individual grain as is practical.

As indicated above, food granules will accumulate in each cooking chamber by virtue of discharge segment 68. As will be appreciated, opening 154 in segment 68 permits only a limited amount of food granules to drop by gravity from each cooking chamber. Surface 155 provides a support surface on which the cooked food granules rest, until opening 154 passes each chamber in turn to permit a limited quantity of rice to drop.

Figure 9:
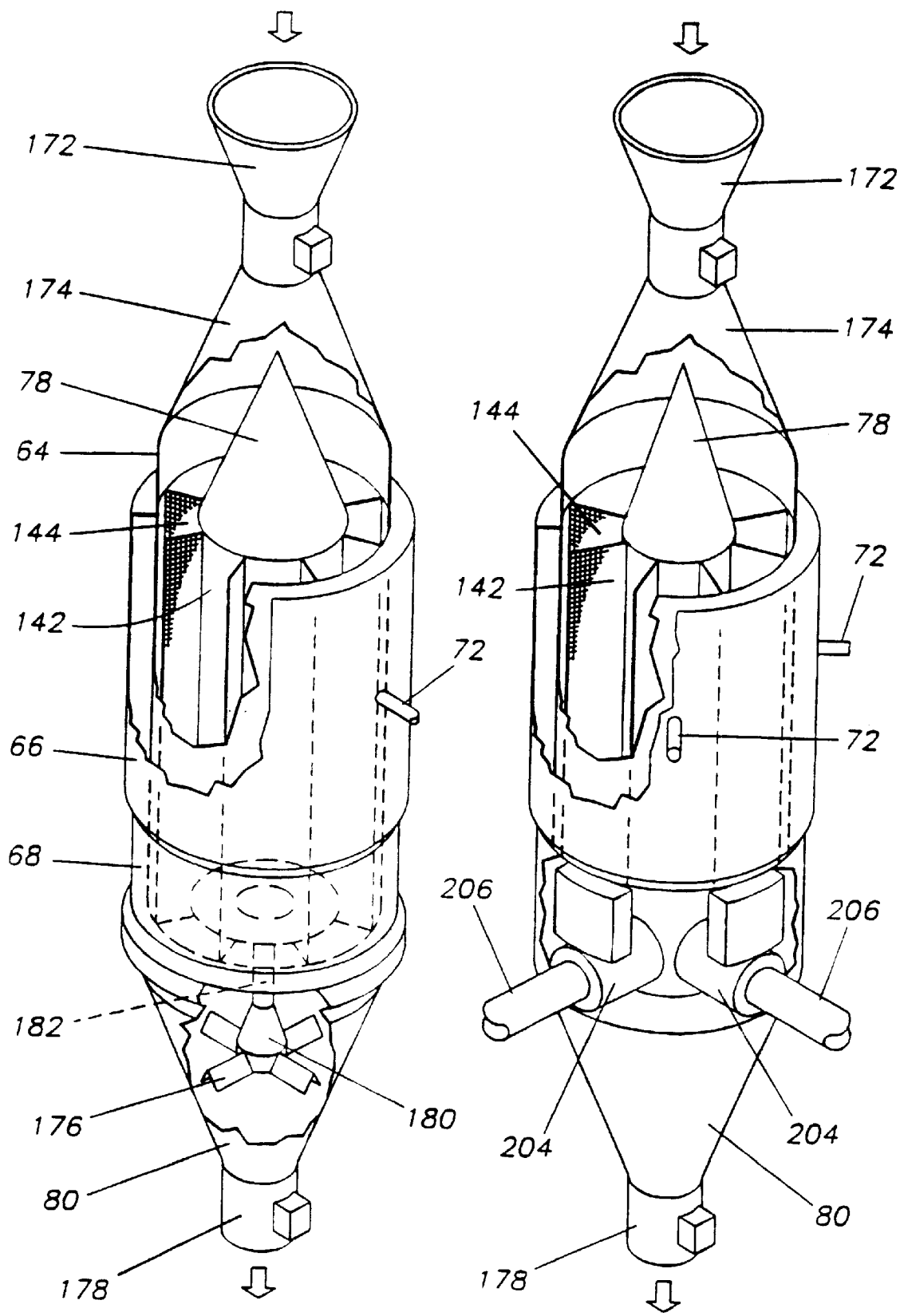
FIG. 9 is a perspective view of yet another embodiment of the steam cooker of the present invention.

In FIG. 9, still another alternate embodiment of the steam cooker is disclosed. Food granules are provided into input funnel 172 where they fall into entry chamber 174 and upon the surface of cone spreader 78. In this embodiment, the steaming chambers are provided in an alternating arrangement, such that cooking chambers 142 alternate with plenum chambers 144 around the periphery of a central chamber 184. Steam is provided through steam line 72 from the exterior of the steam cooker and it proceeds into the four plenum chambers where it is provided through wire mesh or perforated walls into the respective cooking chambers 142.

Further, an arrangement whereby a spindle 182 is aligned along the central axis of the steam cooker is seen in FIG. 9. A discharge paddle 180 rotates discharge paddle blades 176 to assist in the even spreading of food granules and discharge of food granules from the bottom of the steam cooker.

In this way, food granules may be evenly distributed and discharged through hopper 80 and through discharge port 178.

Figure 10:
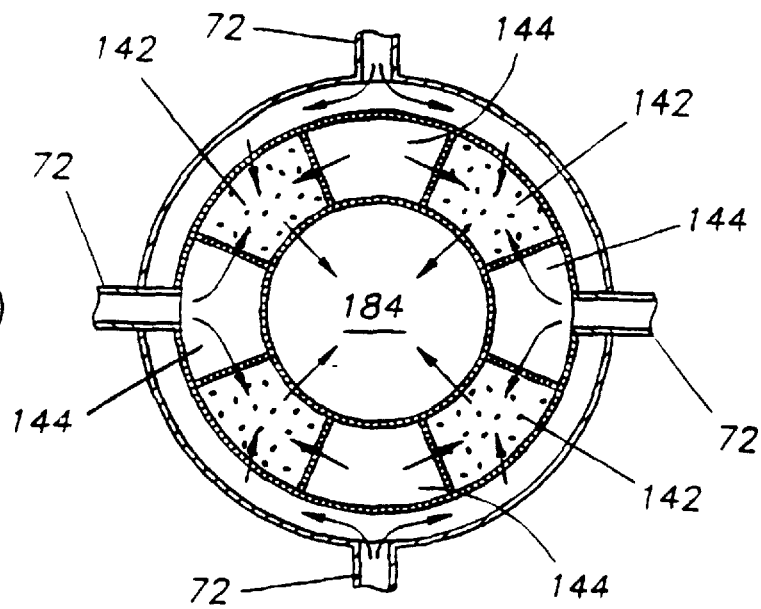
FIG. 10 is a cross-sectional view of the steam cooker which was disclosed in perspective view in FIG. 9.

FIG. 10 shows a cross-sectional view of the steam cooker shown in FIG. 9, whereby the steam enters through steam line 72 and is provided to cooking chambers 142 by way of perforated walls which extend generally radially and define the cooking chamber.

Figure 11:
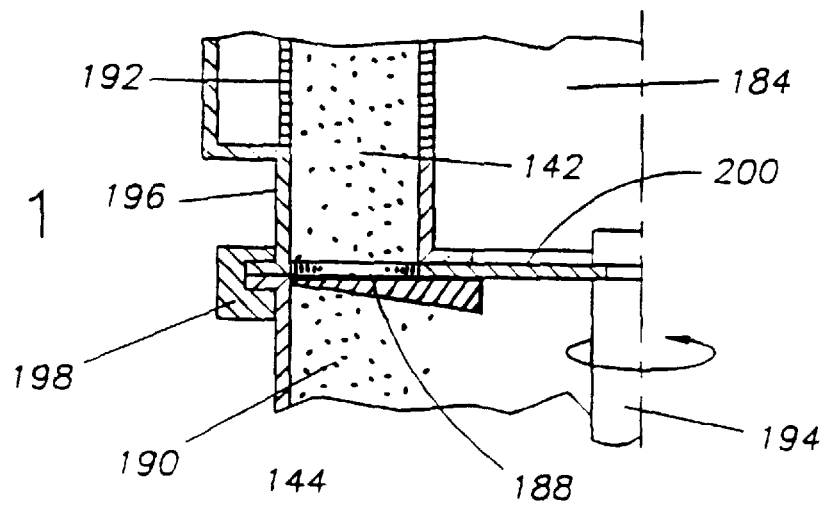
FIG. 11 is a cross-sectional view of the bottom portion of one embodiment of a steam cooker in the present invention.

FIG. 11 shows an alternate apparatus and method which may be utilized to assist in the advancement of food granules out of the bottom of the cooking chamber. In FIG. 11, cooking chamber 142 is shown whereby rotating distributor 188 rotates about the central axis of the cooking chamber to allow cooked food granules 190 to be evenly distributed and in their exit from the cooking chamber. Rotating axle 194 is seen on the right side of FIG. 11. Food granules proceed in a downward progression. Upper frame support 192, lower frame support 198, and frame support 196 provide the exterior surface of the cooking chamber. The housing floor 200 provides stability to the bottom of the cooking chamber.

Figure 13:
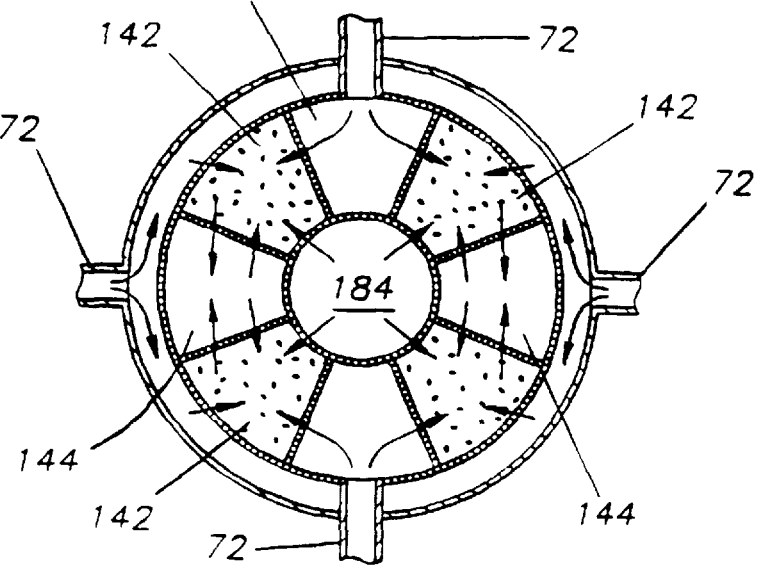
FIG. 13 is a cross-sectional view of the steam cooker disclosed in FIG. 12.

In another embodiment of the steam cooker of the present invention, as seen in FIG. 12, steam may be provided through steam line 206 into rotary valve 204 and ultimately into central chamber 184 (see cross-sectional view in FIG. 13). In this arrangement, the cooking chamber is substantially the same as that of FIG. 9, with the exception that steam is provided directly from steam line 72 into the central chamber 184, where it is distributed into cooking chamber 142 along the central axis outward from the center of the chamber. In other respects, the embodiment shown in FIGS. 12 and 13 is substantially similar to that shown in FIGS. 9 and 10.

The preferred dimensions of the steam cooker of the present invention would be with an outer dimension (measured across the cooker) of approximately 8 feet, although other sizes could be utilized.

The Drying Apparatus and Methods

A rotary dryer is used in the preferred embodiment of this invention for drying the food granules. In some cases, for certain types of food granules, a bed dryer may also be used. In the drying of rice, for example, a rotary dryer and a bed dryer typically are used. Further, in making a highly dehydrated rice such as a quick rehydrating variety of rice, a vertical dryer also is used to reduce the moisture content of the rice to a low level.

Further, a vibratory drainer, seen in FIG. 1, is preferably used in cases where the food granule slurry is pumped in a water slurry form from the steam cooker to the rotary dryer. FIGS. 15A and 15B shown, respectively, a cross-section and an end view of the vibratory drainer, as shown affixed to the entrance of the rotary dryer in FIG. 1.

Of course there are numerous methods of transporting the food granules from the steam cooker to the rotary drying apparatus, and transport by using a water slurry is only one method. For example, a dry transport method could use a combination of rice/air transport by blowing the rice through a conduit, or rice could be transferred on a conveyor belt, if sufficient apparatus (such a breakers) are employed to prevent lumping of the food granules.

The primary purpose of the vibratory drainer as seen in FIGS. 15A and 15B is to take water out of the rice early in the drying process, and to reduce the moisture content of the rice so that the energy consumption of the dryer will be reduced. Further, the amount of maintenance required with regard to the drying apparatus may be reduced by avoiding entry of large amounts of water into the dryer. Further, reducing water from the food granule slurry in the vibratory drainer helps to create a more uniform feedstock to the dryer.

FIGS. 15A and 15B show the details of the vibratory drainer 300. The drainer preferably receives the input food granule slurry 344 as seen in the top of FIG. 15A. The slurry is deposited onto the vibrating screen 346, where the food granules proceed down the food slurry channel 348 towards the right side of the drainer, as seen in FIG. 15A. The food slurry channel is bounded on its upper surface by the top wall 350. Intake port 352 is seen as the opening in the upper portion of the food slurry channel, and water drain space 354 extends along the underside of the vibrating screen 346. Water drains from the food granule slurry into the water drain space, where it collects in water reservoir 356. Water then proceeds out water exit port 358. The food granules which have reduced water content, proceed out the food granule exit 362, and into the drying apparatus. A support structure 360 forms the frame upon which the vibrating drainer is mounted. A vibrating motor 364 is seen on the underside of the water drain space, and a water level sensor 366 extends into the water reservoir to enable the shut down of the vibratory drainer if the water level should rise too high, for example, in a case where the water exit port becomes clogged. Right upper support strut 369 is seen in the upper left portion of FIG. 15A, and right lower support strut 368 is seen on the left side of FIG. 15A.

FIG. 15B shows an end view of the vibratory drainer 300. In this view, the intake port 352 is seen at the top of the figure, with the top wall 350 extending below that level. The left upper support strut 370 and the left lower support strut 371 may be seen at the right edge of FIG. 15B. Further, the food granule exit 362 is seen at the center of FIG. 15B, and the water reservoir 356 and water exit port 358 are seen at the lower portion of FIG. 15B. A support structure 360 is seen on either side of the vibratory drainer and supporting the structure.

Figure 14:
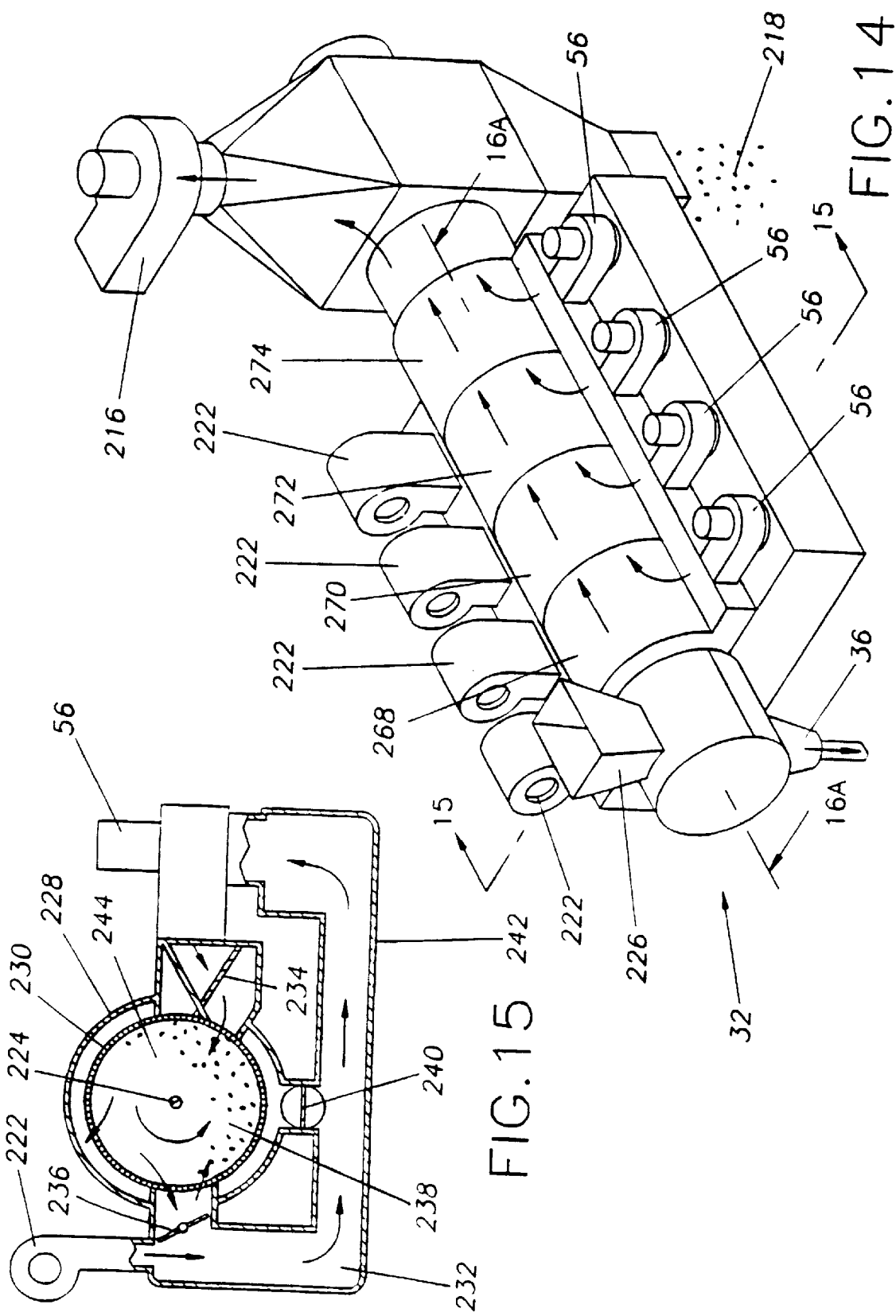
FIG. 14 is a perspective view of the rotary dryer of the present invention.

A remarkable drying effect may be achieved pursuant to the present invention, and in an efficient manner. In FIG. 14, the rotary dryer 32 is provided with a cooked slurry of food granules from vibratory drainer 300 (see FIG. 1 and FIGS. 15A and 15B). The food granules from the vibratory drainer proceed into entry station 226 (FIG. 14) where any remaining water is drained from the slurry through drain line 36. This excess water is recirculated in the recirculation cycle of the invention.

The food granules are provided to the body of the rotary dryer where they are dried as they proceed into the various heat zones of the dryer. The heat zones that may be seen in FIG. 14 are the first heat zone 268, the second heat zone 270, the third heat zone 272, and the fourth heat zone 274. The heat zones may be regulated to various temperatures for various types of drying, depending upon the food particle to be dried (whether it is a cereal grain, a parboiled rice, a short grain rice, etc.) and the temperature of each zone may be regulated to achieve the maximum drying effect for the minimum amount of energy consumption of the dryer. Four separate burners 222 are provided, one to each heat zone, and blower fans 56 recirculate heated air from the main drying chamber through the baffle plate 234 into the rotating barrel, and then into the recirculation duct 232 and then eventually back into the drying chamber (see FIG. 15). As cooked food granules 238 proceed through the body of the dryer, (in the direction of the arrows seen in FIG. 14) their moisture content is reduced. Exhaust fan 216 is provided at the upper end of the rotary dryer to provide a positive air current flow along the path of the food particles being dried. Dried food granules 218 emerge from the distal end of the rotary dryer.

Figure 15:
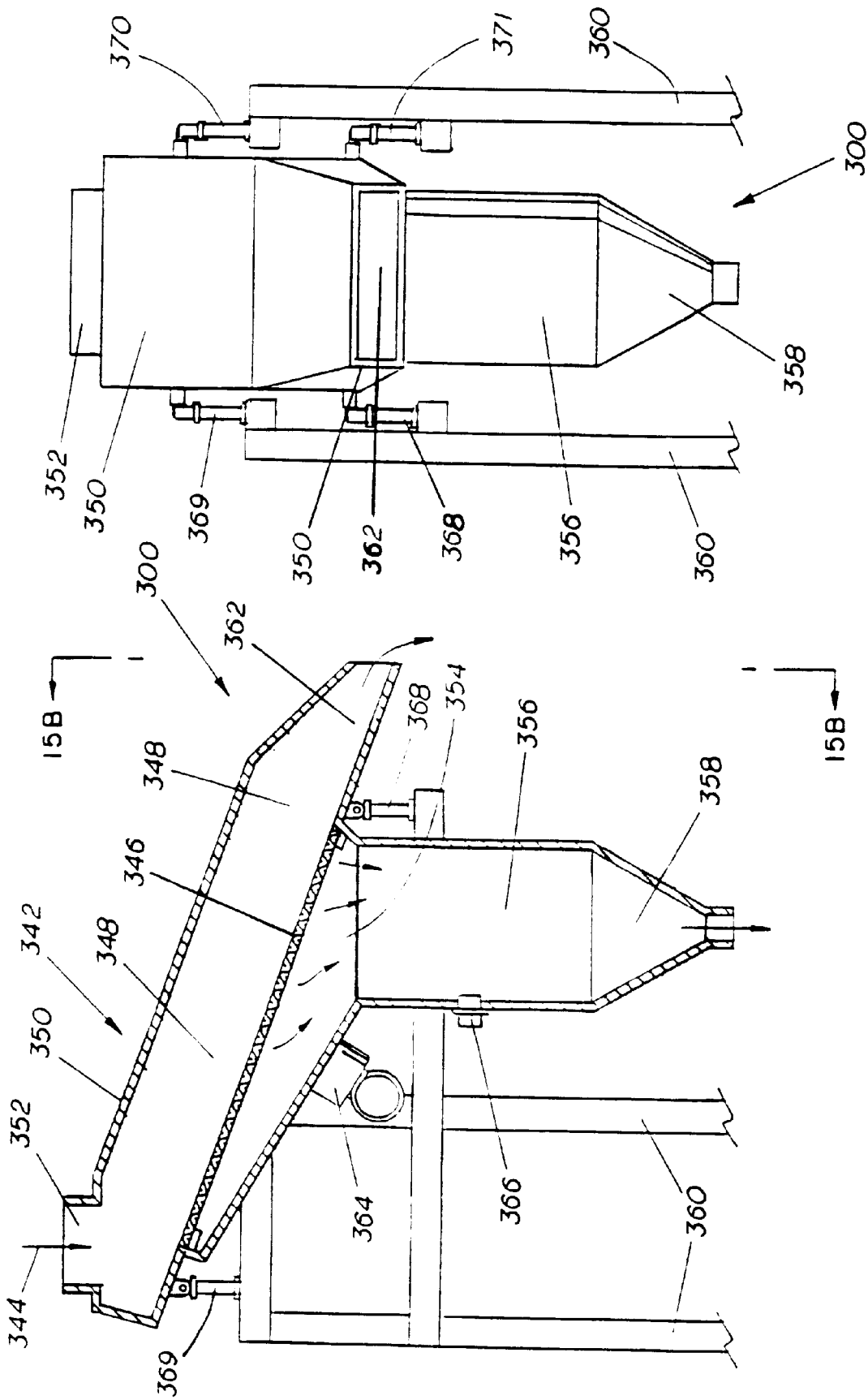
FIG. 15 is a cross-sectional view of the rotary dryer.

In FIG. 15, a cross-sectional view of the rotary dryer is seen. Barrel 230 is rotated about central axle 224. Line 16A (FIG. 14) forms the central axis about which the barrel 230 rotates (see FIG. 15). The food granules proceed along the inner surface of the barrel 230. Air flows from the inner portion of the barrel in drying zone 244 out through the damper 236 and into the recirculation duct 232, where it is circulated back into blower fan 56, and provided through baffle plate 234 back into the drying zone 244. Thus, the air is provided in a circular path about which drying of the food granules may take place. Burner 222 is seen in FIG. 15 as providing a heat source for heating the circulating air. A lower housing 242 and lower damper 240 may be seen in FIG. 15. Damper 236 and blower 56 and baffle plate 234 each may be adjusted to provide appropriate air speed through the rotary barrel.

The air speed at baffle plate 234 is typically less than the air speed within the rotating barrel 230, and the air speed is preferably in the range of 2000 to 3500 feet per minute within the rotary barrel. The speed of the air is increased upon entry into the rotating barrel due to its passage through perforations in the rotating barrel.

Figure 16:
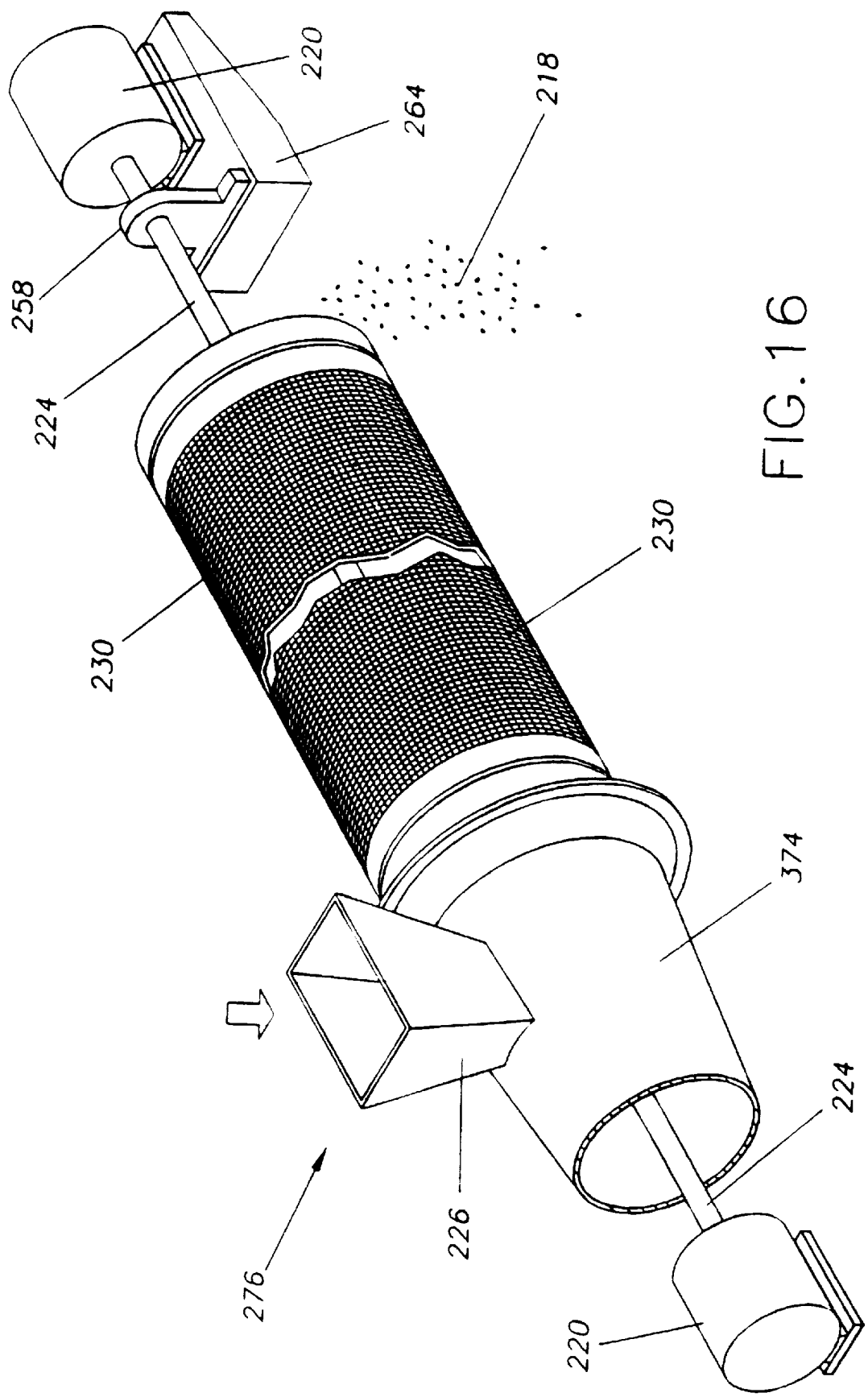
FIG. 16 is a detailed view of the barrel assembly housed within the rotary dryer of the present invention.

FIG. 16 shows barrel assembly 276 which forms a major component of the rotary dryer. Beginning at the left of FIG. 16, motor 220 is seen attached to central axle 224, and it provides rotational torque to the axle. Front end housing 374 forms the reservoir into which the wet food granules proceed from the entry station 226. Food granules proceed along the barrel. The barrel is preferably comprised of wire mesh of sufficiently close spacing such that the food particles will not pass through the mesh, but air and water may freely pass through such mesh. Dryer 32 may be positioned at a slight downward incline from the entry end to its exit end to facilitate the movement of rice.

A rear bearing 258 is held by support 264. Central axle 224 is secured to the motor 220. The motor 220 provides rotational motion to central axle 224. A housing 264 supports the motor assembly.

The rotary dryer is used for initial drying of the product and the residence time of a rice grain in the rotary dryer typically is in the range of approximately 2 to 7 minutes, preferably about 3 minutes. The air volume used in the rotary dryer may be as little as 3,000 or as great as 7,000 cubic feet per minute. The temperature of the air typically is in the range of between 250° F. and 400° F., preferably about 350° F., although it will usually vary in different zones.

FIGS. 16A and 16B show a closeup and detailed view of the barrel assembly which forms the inner rotating portion of the rotary dryer seen in FIG. 14. In FIG. 16A, food granules which exit the vibratory drainer proceed into the entry station 226 as seen at the left side of FIG. 16A. Drain reservoir 412 receives excess water from the food granules after they are deposited into the rotary dryer, and excess water passes along to drain line 36 as seen in the lower left portion of FIG. 16A. They are deposited into the body of the rotary dryer, where a central axle 224 is turning, causing the barrel 230 to rotate on the axis of the central axle 224. Spiral flights 386 and 388 are seen at the left side of FIG. 16A. Food granules, when they first enter the rotary dryer, are in the form of wet globules which must be moved along within the rotary dryer by physical means to flash off the water. This lateral movement from left to right is provided by the spiral flights 386 and 388, as seen in FIG. 16A. Meanwhile, blower ports 376, 378, 380, 382, and 384 provide hot air circulation input which passes through the rotating barrel of the rotary dryer, and then exits the rotary dryer by way of lower air intakes 406, 407, 408, and 409.

As the hot air passes over the food granules within the rotating barrel, water is removed from the food granules. When the food granules have proceeded approximately halfway down the rotating barrel, the granules encounter mixing roller 392, which is fixedly mounted near the exit point of the rotating barrel, at the right side of FIG. 16A. The mixing roller 392 also rotates, which provides a working action of fingers 390, which are mounted upon the mixing roller 392. The fingers 390 help to loosen up and "fluff" the food granules (particularly in the case of rice), and they assist in the drying of the rice in the latter stage of the rotary dryer.

Once the rice or other food granules are sufficiently dry, they proceed to the far right end of the barrel 230, where they encounter adjustable lip plate 400. This plate may be seen at the far right portion of 16A, as a small projection which extends up from the lower right edge of the rotating barrel. In the case of rice, the preferred method of determining retention time of the rice in the dryer is to allow the rice to remain within the rotating barrel until the rice is dry enough, and therefore light enough in weight, such that the action of the rotating barrel will make the rice "hop" over the adjustable lip plate 400. In this way, the adjustable lip plate acts as a hurdle over which the rice will bounce once it has become light enough, due to the action of the rotating barrel 230. After the food granules have passed from the barrel 230, they enter the collection zone 403. Collection zone 403 is defined by the end housing 394, which forms its periphery, and the food granules proceed down through the food granule exit vent 396.

FIG. 16B shows an end view of the rotating barrel as seen along lines 16B as seen at the right margin of FIG. 16A. In FIG. 16B, an inner bearing 398 may be seen at the center of the rotating barrel 230. Upon this bearing, is the rotating central axle 224 which comprises four spokes 404 extending at right angles out from the central axle. Adjustable lip plate 400 is seen releasably mounted upon the end of the barrel 230. This lip plate provides the "hurdle" over which food granules may be required to bounce in order to exit the rotary dryer. The lip plate may be adjusted, by simply removing it and replacing it with a lip plate of a different internal diameter, which would provide a slightly lower or higher "hurdle" for the food granules to bounce over upon exit from the barrel.

There are numerous variables in the drying of rice. Variables include, first, the amount of hydration of the rice as it enters the rotary dryer. Second, the velocity of the air in the rotary dryer. Third, the temperature of the air within the rotary dryer. Fourth, the rotation speed of the barrel 230. Fifth, the suction of the air laterally from left to right. Sixth, the size, shape, and type of the food granule or rice product being dried in the rotary dryer. Seventh, the adjustable lip plate at the end of the barrel, which may be raised or lowered to increase or decrease the residence time of the food granules within the barrel. Each of these variables may be adjusted for the most efficient drying operation pertaining to that particular type of food granule, and the particular type of processing desired.

Rotational speeds of the barrel of less than one cycle per second are preferred. The rotary dryer of the present invention provides the capability to partially dry the surface of the wet food granules or grains, which aids in maximizing the puffing of the final product. Further, the rotational speed of the barrel is relatively low, and the rice preferably is not subjected to large amounts of g forces as in some prior art methods. In this invention, rice is not "plastered" to the inner wall of the rotating barrel in a high speed spin, but instead is subjected to less than one g of force radially directed from the shaft towards the wall of the rotating barrel.

For some applications, it may be desirable to provide variation in the temperature of the heat zones within the rotary dryer. For example, in the first heat zone, seen as first heat zone 268 in FIG. 16A, the air throughput may be very high, with a relatively high temperature to provide a more desirable rice product. The temperature variations along the barrel 230 will provide different degrees of product uniformity, and different amounts of puffing to create the type of product desired.

In the drying of the food granules in the present invention, a typical bed dryer and vertical dryer may be used, both of which are known in the art for drying cereal grains such as rice. In the drying of cereal grains, such as rice, the object is to "set" the product, that is, to give the rice grain a good characteristic for the consumer. It is desirable to "freeze" the rice in a swelled state, by drying it and providing a swelling effect of the water within the rice grain during drying. Further, a puffing effect is desirable whereby water provides pockets of steam within each rice kernel, expanding the grain of rice, to provide appropriate texture and desirable qualities for the consumer.

In a bed drying operation, as indicated by reference numeral 14 in FIG. 1, the temperature is typically between 275° F. and 325° F., preferably about 300° F. A bed dryer is a belt dryer whereby rice is provided through the dryer on a bed or belt, and air is blown either down onto the belt or up through the bottom of the belt. In such bed drying operations, the air velocity is much lower than the rotary drying operation, typically about 300 feet per minute. In the bed drying operation, a residence time of approximately 5 to 15 minutes, preferably about 10 minutes is used.

For certain types of cereal grains, and in particular for quickly rehydrating rices, a vertical dryer, as indicated by reference numeral 15 in FIG. 1, may be used to greatly reduce the moisture content of rice down to a level as low as 6% water. For example, a vertical dryer may be used to provide grain with a residence time in the dryer of approximately two hours. The principles of bed and vertical drying are known by persons skilled in the art.

The Efficient Use of Water in the Present Invention

In the processing of the food granules, water is recirculated and reused so that the amount of water used in the processing of food granules is minimized, i.e., the amount of water used and/or excreted per pound of food processed is kept at a low level.

Figure 17:
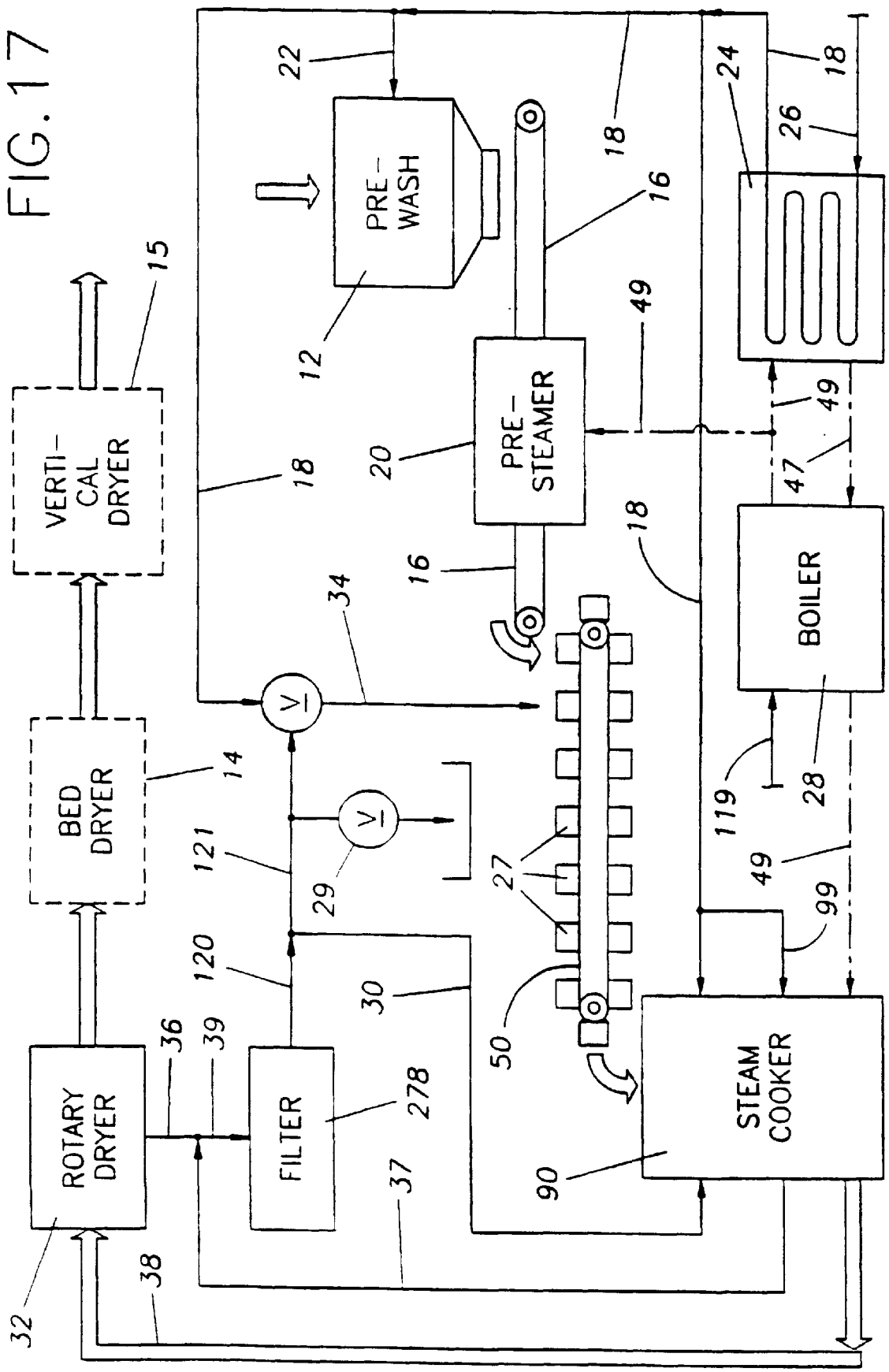
FIG. 17 is a schematic view of the flow of food granules and water through the processing steps of the present invention, including the flow of recirculated water.

FIG. 17 shows the water pathways in the present invention and, in particular, shows the recirculation of water in the present invention in reducing the amount of water consumed and excreted. As shown in both FIGS. 1 and 17, in the cooking of food granules, heat exchanger 24 provides heat to and absorbs heat from the various hot water and steam lines in the processing system. For example, fresh water inlet 26 provides water into the heat exchanger 24, and boiler 28 is provided water from inlet 52. Steam from the boiler may be provided to the heat exchanger along steam line 49, and steam line 47 extends between the heat exchanger and the boiler 28.

The water food granule slurry which proceeds along conveyor line 38 into the vibratory drainer 300 is drained. The drained "used" or recirculated water is provided along drain line 36 to a point at which it is mixed with steamer drain line 37, which comprises "used" water from the steamer. These two lines are mixed (as seen in the upper left hand corner of FIG. 17) into a combined drain line 39. This combined drain line is provided to filter 278 as seen in FIG. 17, and also as seen in FIG. 1.

The filter essentially provides a macroscopic filtering of foreign particles from the water, and the water is then provided to alternate routes. It may be provided along exit line 120 where it may be valved to one of two places. It can proceed along drain line 121, or it may proceed along recirculated water line 30 to be fed back into the steam cooker for reabsorption by the food granules and used in the cooking of food granules at steam cooker 90. If the recirculated water is fed along drain line 121, it may be drained out of the system (into the sewer) from drain 29. As another pathway, the recirculated water may be sent through valving along the path of dispenser line mixture 34, where it may be reinjected into a bucket 27 for reabsorption by uncooked food granules as they proceed towards the steam cooker.

Furthermore, the water that drips from buckets 27 upon release of the food granules from the buckets along the conveyor 50 is collected under the conveyer 50 and provided along drain line 41 to steamer drain line 37, in a similar manner as the water which is drained along drain line 36. Again, a portion of the "used" water may be drained away from the system at drain 29, while some of it is recirculated back into the buckets 27. Further, hot water line 18 provides hot water from the heat exchanger 24 to the steam cooker 90.

In FIG. 1, the amount of water provided to bucket 27 through dispenser line mixture 34 will depend upon the steeping conditions of that particular batch. For certain food granules, a greater mixture of fresh water may be required to prevent gluing of food particles together and to facilitate the free flow of food granules through the system. For maximum water conservation, however, the amount of water provided at hot water line 18 is kept to a minimum, while the recirculated water line 30 is allowed to provide a maximum amount of recycled water, thereby aiding in the overall conservation of water.

Further, fresh hot water is provided from the heat exchanger 24 through hot water line 18 to either the steam cooker 90 or to the prewasher 12. Hot water line 18 provides hot water along hot water line 99 to the steam cooker 90. The prewasher 12 may use water which is warm, hot, or cold, but preferably using the Jiff-Wash system described previously, a cold water rinse is used. A cold water line is available to the prewasher 12, but is not shown in FIG. 17.

If desired, hot water input 22 may provide hot water to the prewasher, either for use in prewashing or for cleaning the apparatus. Conveyor 16 transports food granules through the presteamer 20, where they are deposited into buckets 27, and there they receive the dispenser line mixture 34. Boiler 28 provides steam along steam line 49 to both the steam cooker 90 and to the heat exchanger 24. Steam is provided from the boiler to the presteamer 20 along steam line 49 as seen in FIG. 17.

Further, steam cooker 90 may excrete "used" recirculated water 37, which proceeds along steamer drain line 37, to be filtered and then ultimately either reused or drained from the system. One of the key features of this invention relative to the abilities of reuse water efficiently is the discovery of the water clarity that is achievable for the water exiting the cooker at line 37. It is believed that this is achieved as a result of two things primarily; the use of the pre-steamer step and the overall optimal supply of water in a proper temperature and volume manner so as to avoid the leaching out of loose starch molecules by providing water in quantities that are coordinated to roughly the amount that the rice can absorb at a particular point in the process. The temperature maximum is important because if it is too high, then starch damage (i.e., the release of free starch and the undesirable gluing effect) may occur.

The food granule slurry departs the steam cooker 90 along conveyor line 38, to the rotary dryer 32. Vertical dryer 15 and bed dryer 14 are also seen in FIG. 17, with dashed lines to indicate that they are optional, and not required in the present invention.

Using the recirculation in the present invention, the amount of water used per pound of rice produced may be greatly reduced. In the operations of the present food processing system, the water content of rice as it exits the steam cooker is typically between about 50 to 60% water. Rice is typically about 40% to 50% water as it comes out of the buckets 27 and proceeds to the steam cooker. After cooking, and in the drying stage, the percentage of water after the first stage of drying (rotary drying) is about 20% water, but this percentage will vary depending upon the product.

The present system results in the amount of water applied or excreted being minimized, to a level of less than about 3 to 1 by volume.

If the rice is provided to a bed dryer following rotary drying, the water content may be reduced to about 12%. If further drying is required or desirable, the water content of the rice may be reduced in a vertical dryer to as little as about 6% water. Different rice products will utilize different percentages of water and it should be noted that the greater the amount of moisture reduction achieved, the more expensive the drying process will be in terms of energy consumption.

Obviously, numerous possibilities are available for the recirculated water in the present invention, and the most efficient use of recirculated water will depend upon the cooking conditions, the type of food granules processed, and in the case of rice, will depend upon the variety of rice, and whether it is short grain rice, long grain rice, parboiled rice, etc.

For example, the examples below use only three zones for drying (i.e., zone 1, zone 2 and zone 3; wherein zone 1 is the closest to the entrance of the dryer, zone 2 is next, and zone 3 is the furthest from the dryer entry point). Additional drying zones might be used in other embodiments. Also, the air velocities in the drying zones are in the range of about 2500–3500 feet per minute, preferably about 2500–2800 at the air blower 56, and 3000–3500 feet per minute within the rotating barrel.

EXAMPLE 1

The following example provides the preferred processing conditions for practicing the present invention using precooked, milled, parboiled, white long grain rice as the food granule to be cooked. Of course, these processing conditions may be varied for different varieties of rice or for food granules which are not cereal grains, such as vegetables or other food granules. Further, the specifications below may be varied even for milled white long grain rice if certain other characteristics are desired in the final end product.

In the washing step, it is preferred in this example that the washing occur for a period of about 30 seconds, with the ambient temperature of the washing water at approximately 25° C. The moisture range of the rice after washing is in the range of approximately 16% to 18% water.

In the presteaming step, a 15 minute pre-steam is provided to the rice, with ambient pressure, to achieve a moisture range of the rice of approximately 22% to 25% water.

The steeping step occurs for approximately 15 minutes as the rice moves along the conveyor in buckets 27, using water which is at a temperature of about 80° C. The moisture range achieved during the steeping is a range of approximately 56% to 58% water. The charge of rice used in each container is approximately 15 kilograms, using about 22 liters of water in each bucket for the steeping step.

In the steam cooker 90 (see FIGS. 2A–2C), the rice is cooked for approximately 15 minutes at ambient pressure, achieving a moisture range of about 59% to 60% water.

After steaming, the rice is transported in an aqueous environment for about 30 seconds using water of ambient temperature (about 25° C.), and achieves a moisture content of about 62% to 63% water. The transport occurs by pumping to a dewatering device (vibratory drainer). The rice is transferred to the vibratory drainer, and into the rotary dryer. The temperature of the first zone is about 250° C., while the temperature in the second and third zones is about 195° C. The air velocity is a variable that may affect drying temperature. The retention time of the rice within the barrel of the rotary dryer is about 2½ minutes. This is the time which elapses between the time the rice enters the barrel and the rice exits the barrel by bouncing over the adjustable lip plate 400 at the distal end of the barrel within the rotary dryer. The moisture range of the rice as it exits the rotary dryer is at a level of about 20% to 22% water.

After the rice exits the rotary dryer, it proceeds to a bed dryer for a drying time of about 5–7 minutes. This drying occurs at a temperature of about 100° C., and the rice achieves a moisture range, after drying, of about 9% to 11% water. The end product is a precooked rice requiring about 5 minutes to prepare.

The conditions in these examples are provided as examples only, and they should not be construed to limit the invention in any way.

EXAMPLE 2

In a second example, a five minute, precooked, milled, white, long grain rice is used as the product to be cooked. In order to prepare the rice, the temperature, time, and moisture ranges provided by below are believed to be preferable. Nevertheless, different varieties of rice, and different processing conditions may be employed to achieve a product with different characteristics.

First, parboiled rice is provided, and is prewashed for approximately 30 seconds using water which is ambient temperature, to achieve a moisture range of rice which is approximately 16% to 18% water. The rice is then presteamed for about 10 minutes. This achieves a rice with a moisture content of about 22% to 23% water. The rice is then steeped in buckets, as disclosed herein, for about 10 minutes, at approximately 80° C. The moisture range achieved after steeping is approximately 50% to 52%. The rice is then steam cooked for about 10 minutes in the preferred steam cooker of the present invention. In this case, the steam cooker would be the preferred steam cooker as seen in FIGS. 2A–2C. The rice is then steam cooked at 150° C., and achieves a moisture level of about 53% to 55% water. The rice is then transported in a water slurry, which requires about 15 seconds, at ambient temperature, achieving a moisture level of about 58% to 59%.

The rice is then provided to a rotary dryer for two to three minutes at an air temperature which varies between 195° C. and 250° C. In the rotary dryer, zone 1 is operated at 250° C. (the zone nearest the dryer entrance), and zones 2 and 3 are operated at 295° C., with total retention time in the dryer of about 2.5 minutes. The rice is then at a moisture level ranging from 22% to 25%. The rice is then provided to a bed dryer for 5 to 7 minutes, at a temperature of about 100° C. The moisture level achieved after drying in the bed dryer is about 9% to 11%. As a final product, a 5 minute, precooked, white instant rice is produced which is capable of a five minute simmer cook by the consumer.

EXAMPLE 3

In a third example, a starting material of milled, white, long grain rice is provided for processing. It may be processed in the following example to produce an instant, white, long grain rice with a preparation time of about 7 minutes, and with a firmer cooked texture which is characteristic of European-style marketed rices. First, milled, white, long grain rice is prewashed, as described previously, for 30 seconds using water which is at ambient temperature (about 25° C.). The rice then achieves a moisture range between about 16% and 18% water. The rice is then steam cooked for approximately 10 minutes at ambient pressure, which results in a moisture range between 22% and 23% water. That step is followed by steeping of the rice for 10 minutes using water of 80° C. (176° F.). A moisture level of between 50% and 52% is achieved. The temperature should be controlled during the steeping, and a 15 kilogram charge of rice is utilized with a 22.5 liter quantity of water. The rice is then steam cooked for 10 minutes at ambient pressure to achieve a moisture range of between 53% and 55% water.

The rice is then transported from the steam cooker towards the drying apparatus for a period of time which is about 30 seconds, using ambient water temperature of about 20° C. to 25° C. The moisture range of the rice at this point in the processing is between about 58% and 59% water.

In this embodiment, a slow drying process is preferred, to produce a cooked texture which is characteristic of European-type rices. The drying proceeds for about 30 minutes at approximately 75° C., to achieve a moisture level of between 9% and 11%. The rotary dryer is used, but is not required for this end product. The texture produced by this method requires a low drying temperature, as for example, 75° C. as provided in this particular example. The product produced is an instant, white, long grain rice with a preparation time of about 7 minutes and with a firmer cooked texture.

EXAMPLE 4

In the fourth example, the rice cooked is a brown, long grain rice, and it produces an end product which comprises an instant, brown, long grain rice, with a preparation time of about 10 to 12 minutes. Further, if softer texture is desired, a 12 minute preparation time is recommended, however, this example provides a rice with a preparation time that is preferably about 10 minutes.

First, the rice is prewashed for 30 seconds with an ambient water temperature, to produce a moisture content of the rice between 14% and 16%. The rice is then presteamed for 18 minutes at ambient pressure. A moisture level of about 18% to 20% is achieved.

The rice is then steeped for 18 minutes at 80° C. (176° F.). A moisture range of between 42% and 45% is achieved after the steeping step. The rice is then steam cooked for 18 minutes at ambient pressure, to achieve a moisture range of 50% to 55% water.

The rice is then transported, by way of water, for about 30 seconds out of the steam cooker and to the drying apparatus. The moisture range at this point is 58% to 59% water.

The rice is then dried in the rotary dryer, using dryer temperatures in zone 1 (the zone closest to the inlet of the dryer) of 230° C. Zone 2 is at a temperature of about 195° C., and zone 3 is also at a temperature of about 195° C. The moisture level of the rice after rotary drying is about 15% to 18% water.

The rice is then provided to a bed dryer for a drying time of between 5 and 7 minutes at 100° C. (212° F.). The moisture content of the rice after bed drying is between 9% and 11%. The product of this particular example is an instant, brown, long grain rice with a preparation time by the consumer of about 10 to 12 minutes.

Modifications of the apparatus and methods disclosed in this patent application could be conceived by a person skilled in the art, without departing from the spirit or scope of the invention. For example, it is contemplated that the present invention could be utilized whereby a different number of heating sections in the rotary dryer or a different configuration of the cooking segments in steam cooker 90 may be established.

It is anticipated that different types of steam cookers could be established which utilize either vertical means of feeding food granules by way of gravity inducement, or a horizontal method might be established whereby food granules may be cooked and fed through in a horizontal manner. Further, it is obvious that variations could occur in the method and apparatus of recirculating water in the present invention to most advantageously and efficiently utilize the least amount of input water and excrete the least amount of waste water. The present invention is not limited to the disclosure in this regard, and other arrangements could be easily conceived. Further, the temperatures, pressures, and cooking conditions disclosed herein are disclosed as the preferred and alternate embodiments, but cooking could occur using temperatures, pressures, and/or methods that are not disclosed in the present specification, but still fall within the scope of this invention. Additionally, although the disclosed apparatus and methods have been described primarily for use with rice, these apparatus and processes are suitable for use with other food products, as well. The present disclosure is intended to cover all such modifications as fall within the scope of the appended claims, including equivalents.

What is claimed is:

1. A steam cooker for cooking a food product, comprising:
   a steam chamber adapted to provide a steam environment for cooking the food product;
   a plurality of vertically spaced rotatable food product support structures disposed within the steam chamber, each support structure rotatable about an axis from a cooking position to a flow position, the cooking position supporting the food product during cooking, and the flow position facilitating transfer of the food product from the rotatable support structure; and
   a conduit for supplying steam to the food product via the axis of each support structure.

2. The steam cooker of claim 1, further comprising a drainer configured for draining moisture from the food product prior to entering the steam chamber.

3. The steam cooker of claim 1, further comprising a supply line for providing fluid to entrain the cooked food product away from the steam cooker.

4. The steam cooker of claim 1, wherein the support structures define between 2 to 30 (inclusive) vertically arranged steam zones within the steam chamber.

5. The steam cooker of claim 1, wherein the support structures are independently rotatable.

6. The steam cooker of claim 1, wherein the support structures define a plurality of vertically arranged steam zones, each successive steam zone being larger than the immediately preceding steam zones.

7. The steam cooker of claim 1, wherein the support structures are rotatable up to approximately 90° about their respective axes.

8. The steam cooker of claim 1, wherein the conduit includes apertures for providing steam from above the food product.

9. The steam cooker of claim 1, wherein the conduit includes apertures for providing steam from below the food product.

10. The steam cooker of claim 1, wherein the conduit includes apertures for providing steam from above and below the food product.

11. A steam cooker for cooking a food product, comprising:
   a steam chamber comprising a plurality of vertically arranged steam zones for cooking the food product;
   a plurality of partitions which define the steam zones, the partitions being rotatable about an axis from a cooking position to a flow position, the cooking position supporting the food product during cooking within each zone, and the flow position facilitating transfer of the food product from each zone; and
   a conduit for providing steam to the zones via the axis.

12. The steam cooker of claim 11, wherein each successive steam zone is larger than the immediately preceding zone.

13. The steam cooker of claim 11, further comprising a drainer configured for draining moisture from the food product prior to entering the steam chamber.

14. The steam cooker of claim 11, further including a supply line for providing fluid to entrain the cooked food product away from the steam cooker.

15. The steam cooker of claim 11, wherein the partitions define between 2 to 30 (inclusive) steam zones within the steam chamber.

16. The steam cooker of claim 11, wherein the partitions are independently rotatable.

17. The steam cooker of claim 11, wherein the partitions are configured to form 10 vertically arranged steam zones within the steam chamber.

18. The steam cooker of claim 11; wherein the partitions are rotatable up to approximately 90° about their respective axes.

19. The steam cooker of claim 11, wherein the conduit includes apertures for providing steam from above the food product.

20. The steam cooker of claim 11, wherein the conduit includes apertures for providing steam from below the food product.

21. The steam cooker of claim 11, wherein the conduit includes apertures for providing steam from above and below the food product.

22. A steam cooker for cooking a food product, comprising:
   a steam chamber adapted to provide a steam environment for cooking the food product;
   a plurality of vertically spaced rotatable food product support structures which define a plurality of vertically arranged steam zones within the steam chamber, each successive steam zone being larger than the immediately preceding steam zone, each support structure rotatable about an axis from a cooking position to a flow position, the cooking position supporting the food product during cooking, and the flow position facilitating transfer of the food product from the steam zones; and
   a conduit for supplying steam to the food product via the axis of each support structure, the conduit including apertures for providing steam from above and below the food product.

* * * * *